(12) United States Patent
Ji et al.

(10) Patent No.: US 7,070,721 B2
(45) Date of Patent: Jul. 4, 2006

(54) METHOD OF MAKING AND USING A HOLLOW FIBER MICROFILTRATION MEMBRANE

(75) Inventors: Jiang Ji, Andover, MA (US);
Candeloro DiCecca, Somerville, MA (US); Edward M. Schulz, Acton, MA (US); Mahesh Mehta, Needham, MA (US); David Stead, Lowell, MA (US); David McKinley, Melrose, MA (US); David H. Koch, New York, NY (US)

(73) Assignee: Koch Membrane Systems, Wilmington, MA (US)

(*) Notice: Subject to any disclaimer, the term of this patent is extended or adjusted under 35 U.S.C. 154(b) by 0 days.

(21) Appl. No.: 10/970,487

(22) Filed: Oct. 21, 2004

(65) Prior Publication Data
US 2005/0103716 A1    May 19, 2005

Related U.S. Application Data

(62) Division of application No. 10/058,983, filed on Jan. 28, 2002, now Pat. No. 6,890,435.

(51) Int. Cl.
*B01D 65/00* (2006.01)

(52) U.S. Cl. .............. 264/41; 210/500.23; 210/500.41; 210/500.42; 264/177.1; 264/177.14; 264/178 R

(58) Field of Classification Search ........... 210/500.41, 210/500.42, 500.27, 500.23; 264/41, 177.1, 264/178 R, 177.14
See application file for complete search history.

(56) References Cited

U.S. PATENT DOCUMENTS

| 1,421,341 | A | | 6/1922 | Zsigmondy |
| 4,399,035 | A | | 8/1983 | Nohmi et al. |
| 4,481,260 | A | | 11/1984 | Nohmi |
| 4,612,119 | A | | 9/1986 | Eguchi |
| 4,690,766 | A | | 9/1987 | Linder et al. |
| 4,822,223 | A | * | 4/1989 | Williams ............... 411/82 |
| 5,039,421 | A | | 8/1991 | Linder et al. |
| 5,151,227 | A | | 9/1992 | Nguyen et al. |
| 5,340,480 | A | | 8/1994 | Kawata et al. |
| 5,401,410 | A | | 3/1995 | Bell et al. |
| 5,443,727 | A | | 8/1995 | Gagnon |
| 5,462,867 | A | * | 10/1995 | Azad et al. ............. 435/181 |
| 5,762,798 | A | | 6/1998 | Wenthold et al. |
| 5,833,896 | A | * | 11/1998 | Jacobs et al. ............ 264/41 |
| 5,871,680 | A | | 2/1999 | Macheras et al. |
| 5,906,742 | A | | 5/1999 | Wang et al. |
| 5,979,670 | A | | 11/1999 | Ditter et al. |
| 6,110,369 | A | | 8/2000 | Ditter et al. |
| 6,165,363 | A | | 12/2000 | Oishi et al. |
| 6,218,441 | B1 | | 4/2001 | Meluch et al. |
| 6,432,309 | B1 | | 8/2002 | Fuke et al. |

(Continued)

*Primary Examiner*—Ana M. Fortuna
(74) *Attorney, Agent, or Firm*—Stinson Morrison Hecker LLP

(57) ABSTRACT

A hollow fiber microfiltration (MF) membrane is provided. The casting solution used to make this membrane includes a fiber-forming polymer having a degree of polymerization greater than about 1000, a water-soluble polymer, an anhydride with about 2 to 12 carbon atoms, and a solvent. The membrane is formed by mixing and heating these components to form a viscous dope and then extruding the dope through an annular orifice to form a hollow fiber MF membrane. The hollow fiber membrane is then fed through a coagulation bath and two leaching baths. The membrane is especially useful for filtering liquids, such as wine and juice, so as to remove bacteria, gel, and solid particles from the liquids.

12 Claims, 28 Drawing Sheets

U.S. PATENT DOCUMENTS 6,596,167 B1 * 7/2003 Ji et al. .................. 210/500.42
6,755,900 B1 * 6/2004 Koros et al. ................... 96/10
6,884,350 B1 * 4/2005 Muller .................. 210/500.36
6,890,435 B1 * 5/2005 Ji et al. .................. 210/500.23

* cited by examiner

METHOD OF MAKING AND USING A HOLLOW FIBER MICROFILTRATION MEMBRANE

CROSS-REFERENCE TO RELATED APPLICATIONS

This application is Divisional of U.S. patent application Ser. No. 10/058,983, filed on Jan. 28, 2002, now U.S. Pat. No. 6,890,435 which is hereby incorporated by reference in its entirety.

STATEMENT REGARDING FEDERALLY SPONSORED RESEARCH OR DEVELOPMENT

Not applicable.

BACKGROUND OF THE INVENTION

The present invention relates to a filtration membrane and a method of making this membrane. More specifically, this invention relates to a hollow fiber membrane for use in filtering liquids to remove very large soluble molecules and suspended particles in the liquid.

Membranes are thin-film barriers that allow certain components of a fluid mixture to selectively pass through the membrane while discriminating against other components in the mixture to achieve separation. Membranes are typically formed from polymers and are semi-permeable. The specific physical shape or form of a membrane can vary and can include flat sheets, tubular membranes, and hollow fibers. The specific use to which a membrane is to be put dictates the form selected for its construction. Membranes in the form of hollow fibers are currently used in a variety of applications, including dialysis, gas separation, and ultrafiltration.

A microfiltration membrane filters out suspended particles from a fluid mixture. Normally, microfiltration membranes are made as flat sheets. One disadvantage of flat sheet membranes is that they require more volumetric space than a hollow fiber membrane to provide the same filtration surface area.

Unfortunately, it is difficult to make a hollow fiber microfiltration membrane. The formulation and casting conditions used to obtain a flat sheet microfiltration membrane normally are not applicable for forming a hollow fiber membrane because the viscosity of the casting solution is too low and gravity causes the extruded solution to be broken into pieces.

To obtain a hollow fiber membrane using the casting conditions for a flat sheet microfiltration membrane, a casting solution with a much higher polymer concentration and viscosity is needed. The membrane obtained under such conditions is usually an ultrafiltration membrane rather than a microfiltration membrane. The resulting ultrafiltration membrane not only filters suspended particles out of a liquid mixture but also filters macromolecules out of the liquid mixture. For this reason, the ultrafiltration membrane, unlike a microfiltration membrane, cannot be used only to filter suspended particles from wine, juice, other beverages, and pharmaceutical compounds.

In order to obtain a hollow fiber microfiltration membrane, different formulations and casting conditions from those used to make a flat sheet microfiltration membrane must be employed. U.S. Pat. No. 4,612,119 discloses a method of making a hollow fiber microfiltration membrane that employs a casting solution made from polysulfone, propylene glycol and N-methyl-pyrrolidone. The inside coagulating liquid includes either 70% N-methyl-pyrrolidone aqueous solution, a liquid mixture of methanol and acetone at 1:1 weight ratio, or water. Under these conditions, the hollow fiber membranes obtained are micropourous, but have a very broad pore size distribution. As such, the broad pore size distribution of the membrane limits its applications due to its poor selectivity.

U.S. Pat. No. 5,151,227 discloses another method for making a hollow fiber microfiltration membrane that involves using a continuous spinning process and a casting solution that includes polysulfone, PVP and N-methyl-pyrrolidone. The membrane solution and the bore fluid are delivered by hydraulic pressure rather than a metering pump. However, delivery of bore fluid and membrane solution by hydraulic pressure decreases the precision of the delivery of the fluids. Under these conditions, the hollow fiber membranes obtained also have a broad pore size distribution limiting their applications.

U.S. Pat. No. 4,399,035 discloses yet another method of making a hollow fiber microfiltration membrane. This method involves using a casting solution that includes polyvinylidene fluoride, dimethylacetamide and one or two surfactants, such as polypropylene glycol or polyoxyethylene sorbitan monooleate. The casting solution is extruded into a hollow fiber by means of a gear pump from an annular hollow filament spinning nozzle. One disadvantage with this method is that the large amount of surfactant used in the casting solution not only slows down the phase inversion rate and productivity but also produces a lot of foam that is difficult to handle on a large production scale.

In order to overcome the disadvantages of membranes currently available, a hollow fiber microfiltration membrane with a narrow pore size distribution is needed. Still further, a process for making such a membrane that is efficient and is easily reproducible is needed.

SUMMARY OF THE INVENTION

It is an object of the present invention to provide a hollow fiber membrane that has a narrow pore size distribution and a method of making this membrane so that beverages such as juices and wine may be filtered.

It is another object of the present invention to provide a hollow fiber microfiltration membrane that has excellent mechanical strength so as to improve membrane durability and performance.

It is still another object of the present invention to provide a method for making a hollow fiber microfiltration membrane that allows the membrane to be produced efficiently on a large production scale.

It is yet another object of the present invention to provide a hollow fiber microfiltration membrane that has a narrow pore size distribution so as to remove bacteria, gel and/or suspended particles from a liquid while allowing the pigment of the liquid to pass through the membrane.

According to the present invention, the foregoing and other objects are achieved by the hollow fiber membrane of the present invention. The casting solution used to make this membrane includes a mixture of a fiber-forming polymer having a degree of polymerization over about 1,000, a water-soluble polymer, an anhydride with 2 to 12 carbon atoms, and a solvent. The membrane is formed by mixing and heating these components to form a viscous dope and then extruding the dope through an annular orifice to form a hollow fiber membrane. The hollow fiber membrane is then fed through a coagulation bath and two leaching baths.

The membrane is especially useful for filtering liquids, such as wine and juice, so as to remove bacteria, gel, and solid particles from the liquid.

Additional objects, advantages, and novel features of the invention will be set forth in the description that follows and in part will become apparent to those skilled in the art upon examination of the following, or may be learned by practice of the invention.

BRIEF DESCRIPTION OF THE DRAWINGS

In the accompanying drawings, which form a part of the specification and are to be read in conjunction therewith.

DETAILED DESCRIPTION OF PREFERRED EMBODIMENT

Figure 1:
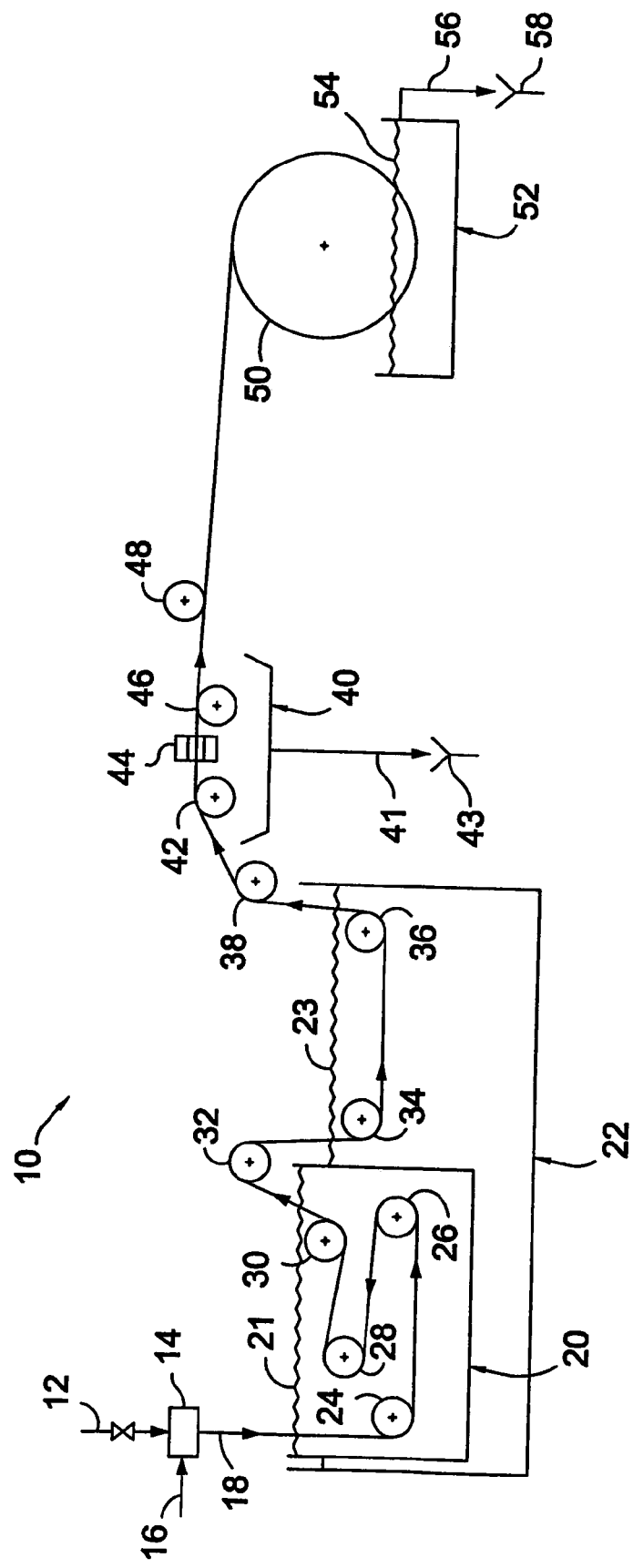
FIG. 1 is a schematic representation of a hollow fiber spinning system used in the making of the membrane of the present invention.

The membrane of the present invention is a hollow fiber microfiltration membrane. The casting solution used to make this membrane includes a mixture of a fiber-forming polymer, a water-soluble polymer, an anhydride and a solvent. The membrane is formed by mixing and heating these components to form a viscous dope and then extruding the dope through an annular orifice to form the hollow fiber membrane.

More specifically, the membrane of the present invention is made by preparing a homogenous membrane casting solution from a fiber-forming polymer, a water-soluble polymer, an anhydride and the solvent. The fiber-forming polymer and water-soluble polymer are dissolved in the solvent and mixed at an elevated temperature using a Myers mixer from Myers Engineering, Inc. of Bell, Calif. The mixture obtained is then mixed with an anhydride at ambient temperature for a period of time to produce a homogeneous and viscous solution or dope. The viscous membrane casting solution is degassed with a vacuum and transferred into a storage tank. Preferably, the viscous membrane casting solution or dope is allowed to stand at ambient temperature for at least about 24 hours before use.

The fiber-forming polymers of the casting solution have a degree of polymerization over about 1,000. The fiber-forming polymer may be, but is not limited to, polysulfone, polyvinylidene fluoride, polyethersulfone, polyetherketone, polypropylene, polyethylene, polyacrylonitrile, polyamides, polyimides, cellulose acetate and combinations thereof. Preferably, the fiber-forming polymer is polysulfone or polyvinylidene fluoride.

The water-soluble polymer used in the casting solution is a polymer additive with significant solubility in a polymer solution. The water-soluble polymer may be, but is not limited to, polyvinylpyrrolidone, polyvinylpyrridine, polyacrylamide, polyethylene oxide, polyvinyl alcohol and combinations thereof. Preferably, the water-soluble polymer used is polyvinylpyrrolidone.

There are many acceptable solvents which can be used in the casting solution, and the solvent can be either protic or aprotic. Suitable solvents are those which are capable of solubilizing the fiber-forming polymer and the water-soluble polymer. Preferably, the solvent in which the components of the membrane are mixed is a polar solvent. It may be, but is not limited to, dimethylacetamide, N-methyl-pyrrolidone (NMP), dimethyl formamide, dimethylsulfone, trialkylphosphate, or combinations thereof. Preferably, the solvent is N-methyl-pyrrolidone.

The anhydride of the casting solution has about 2–12 carbon atoms. The anhydride may be, but is not limited to, maleic anhydride, acetic anhydride, trifluoroacetic anhydride, phthalic anhydride, succinic anhydride, glutaric anhydride, acetic formic anhydride, trifluoroacetic propionic anhydride, malonic anhydride and combinations thereof. Preferably, maleic anhydride is used in the casting solution. Maleic anhydride is preferred because it has a high solubility in the casting solution and it remains in the membrane matrix during phase inversion and shows instability towards hydrolysis.

The concentration of the fiber-forming polymer is about 10–40% by weight of the membrane casting solution. Preferably, the fiber-forming polymer is about 12–30% by weight of the casting solution, and most preferably, it is about 15–20% by weight of the casting solution. The water-soluble polymer is about 5–40% by weight of the casting solution. Preferably, the water-soluble polymer is about 8–25% by weight of the casting solution, and most preferably, it is about 15–20% by weight of the casting solution. The anhydride is about 5–40% by weight of the casting solution. Preferably, the anhydride is about 8–25% by weight of the casting solution, and most preferably, it is about 15–20% by weight of the casting solution.

Figure 19:
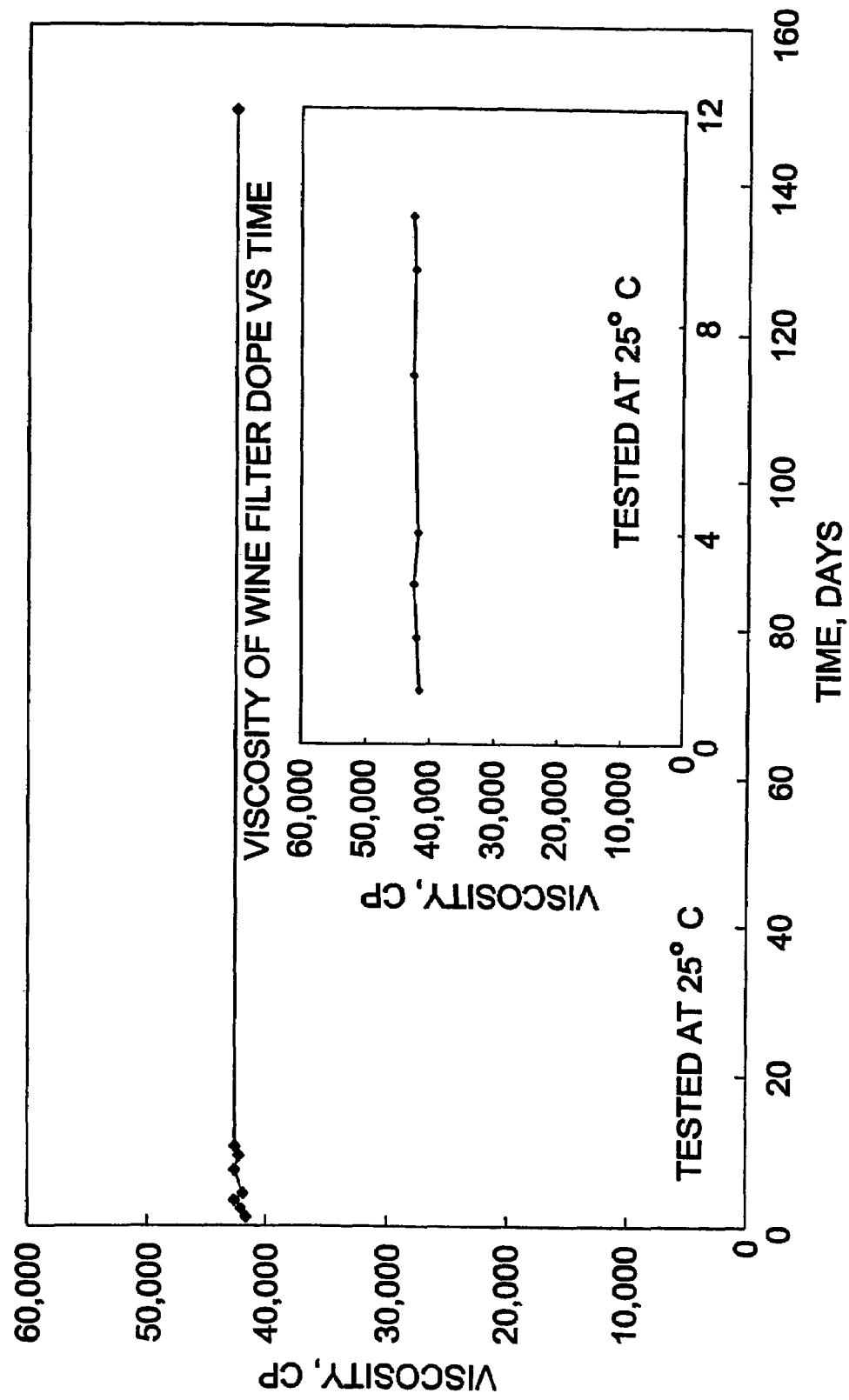
FIG. 19 is a plot showing viscosity over time of the membrane casting solution as obtained from the method of the present invention as outlined in Example 3.

The composition and spinning conditions of a typical casting solution of the present invention are shown in Table 3 from Example 3, discussed infra. The typical casting solution has an approximately constant viscosity over a five month time period, as shown in FIG. 19. The viscosity within the first 10 days is displayed in a smaller insert chart in FIG. 19. Typically, the casting solution is produced in about one week. The casting solution of the present invention is very stable and suitable for production of hollow fiber membranes on a large scale.

The viscous solution or dope has a viscosity of about 10,000 to 100,000 centipoise (cp) at about 25° C. The viscous dope, which is the membrane casting solution, is extruded through an annular orifice to form a hollow fiber. More specifically, it can be pressurized from a storage tank into a gear pump and then extruded through an annular orifice of a spinneret, generally the tube-in-orifice type, into a hollow core extrudate fiber. Internal bore fluids are often co-extruded within the hollow fiber membrane to form the bore or lumen of the hollow fiber. Preferably, the bore fluid is delivered using a metering pump. Following extrusion, the polymeric membranes of the present invention are formed by a phase inversion process induced by diffusion of water or water vapor from outside the hollow fiber and diffusion of a bore fluid from inside the hollow fiber membrane.

More specifically, hollow fiber membranes may be made from the membrane casting solution using a hollow fiber spinning system, as shown in FIG. 1 and designated by reference numeral 10. A membrane casting solution in line 12 is extruded through an annular orifice of a spinneret 14 into a hollow fiber. A bore fluid in line 16 is applied in a lumen at the inside of the hollow fiber to control pore size. An extruded fiber 18 exits spinneret 14 and is allowed to fall freely in the air before reaching a coagulation bath 20 containing water, N-methyl-pyrrolidone (NMP), isopropylnol, polyethylene glycol, or combinations thereof as a coagulating agent. Preferably, it falls for about 2 to 3 inches. The quenched fiber travels through coagulation bath 20 to a first leaching bath 22 for a predetermined time period. Wheels 24, 26, 28, 30, 32, 34, and 36 move fiber 18 through the coagulation bath 20 and the leaching bath 22, along the path of the spinning system.

Fiber 18 then exits first leaching bath 22 via a wheel 38 and is taken to a godet station 40. In godet station 40, it is carried by wheel 42 through a laser scan micrometer 44. Excess water exits godet station 40 in line 41 and then goes through funnel 43. Next, it is moved along by wheels 46 and 48. A take-up wheel 50, which is partially immersed in a second leaching bath 52, directs extruded hollow fiber 18 into second leaching bath 52. The fiber 18 wraps around take-up wheel 50 so as to be collected. Leaching bath 52 is filled with fluid 54, which is kept at a constant level by using line 56 to drain excess fluid. From line 56, the fluid enters funnel 58.

The rate of phase inversion is controlled, at least in part, by utilizing bore fluid 16 and/or coagulation bath 20. Internal bore fluid 16 is co-extruded in the lumen of the fiber, helping to solidify and form the inner core of the hollow fiber membrane. Extruded hollow fiber 18 is passed through a coagulation bath 20 containing a mixture of a solvent such as NMP and a nonsolvent such as water or an alcohol, and fiber 18 is allowed to further solidify. The extruded hollow fiber 18 is then passed through first leaching bath 22 where the membrane substantially solidifies. The membrane pore size can be regulated, at least in part, by controlling the solvent content in the coagulation bath 20 and/or in bore fluid 16.

Bore fluid 16 assists in the formation of fiber 18 from the inside out, whereby the inner wall of the fiber begins to coagulate as it comes into contact with the bore fluid. The bore fluid may be, but is not limited to, N-methyl-pyrrolidone, polyethylene glycol, isopropylnol, water and combinations thereof.

As with bore fluid 16, fluid 21 in coagulation bath 20 generally comprises a mixture of solvents and a portion of the same solvent used in the making of the polymer mixture. The coagulation bath fluid may be, but is not limited to N-methyl-pyrrolidone, polyethylene glycol, isopropylnol, polyethylene glycol, water and combinations thereof.

Coagulation or gelation bath 20 is comprised of 0–66% by weight solvent and is at a temperature of about 20–99° C. Preferably, the temperature of bath 20 is about 30–80° C., and most preferably its temperature is about 40–60° C.

After leaving coagulation bath 20, fiber 18 is leached in leaching bath 22 and then is leached for at least about 30 minutes in leaching bath 52 in order to remove the remaining solvent from fiber 18. Leaching baths 22 and 52 are comprised of a nonsolvent, such as water. After leaching, fiber 18 is preserved by placing it in an aqueous solution (not shown) containing glycerol. Preferably, the aqueous solution contains at least about 25% by weight glycerol. Finally, the hollow fiber membrane is dried in an oven (not shown). Preferably, it is dried at about 50° C. for about 24 hours.

Leaching baths 22 and 52 are nonsolvent baths each having a temperature of about 20–99° C. Preferably, this temperature range is between about 30–80° C., and most preferably, each leaching bath has a temperature of between about 40–60° C.

Usually, hollow fiber 18 is formed at a fiber spinning speed of about 5–300 feet per minute (ft/min). Preferably, the fiber spinning speed is about 50–100 ft/min. Most preferably, the fiber spinning speed is about 70–80 ft/min.

The membrane of the present invention has a tensile strength of at least about 400 psi. This membrane has a water flux of about 100 to 6000 gallons per square foot per day (gfd) at about 20 psi. It has a weight average molecular weight cutoff of greater than about 8,000,000 Dalton poly (ethylene oxide).

Fibers spun using a spinneret, such as described above, can have wall thicknesses and outer diameters according to the specifications of the spinneret utilized. According to the present invention, the hollow fiber wall thickness can be widely varied and is preferably in the range of about 1–50 mil. The outer diameter can also vary widely, and preferably, it is about 1–300 mil. The inside diameter can also vary, and preferably, it is about 1–300 mil. It is understood that these values can easily be varied to achieve the desired properties of the end product membrane. The diameter of the formed hollow fiber may be monitored using a laser scan micrometer, as described above.

The membrane of the present invention is for use in filtration. Preferably, the membrane can be used for microfiltration. This membrane of the present invention has a narrow quasi Gaussian pore size distribution of about 0 to 0.3 μm, with an average pore size of about 0.15 to 0.30 μm. Preferably, the pore size distribution is about 0 to 0.1 μm, and the average pore size is 0.2 μm. The narrow pore size distribution aids in the removal of bacterial, gel and/or suspended particles from a liquid. In addition, the narrow pore size distribution allows macromolecules, such as pigment, to pass selectively through the membrane.

The membrane of the present invention is useful for filtering liquids, such as white wine, red wine, vegetable juice, and fruit juice. In particular, the membrane of the present invention is especially useful for filtering red wine because it does not remove the pigment. The membrane of the present invention can remove bacteria and suspended particles from the wine while allowing the red wine pigment pass through the membrane. In addition, the hollow fiber membrane can filter a larger volume of fluid mixture than a flat sheet membrane using the same amount of volumetric space.

The following are examples of methods for making membranes of the present invention. These examples are not meant in any way to limit the scope of this invention.

EXAMPLE 1

To a 2 gallon mixer, 3250 grams of N-methyl-pyrrolidone (NMP) were added to 750 grams of polysulfone (PS) (degree of polymerization was about 1700) and 250 grams of polyvinylpyrrolidone (PVP) while stirring. The mixture was stirred at 60° C. at 1000 rpm until it formed a homogenous mixture. The mixture was cooled to ambient temperature of about 22° C. Then, 750 grams of maleic anhydride (MA) were added to the mixture. This mixture was stirred at ambient temperature. It formed a homogeneous viscous solution, then it was degassed under a vacuum to give a viscous dope. The dope was transferred to a 5 gallon storage tank and was allowed stand still at ambient temperature for at least 24 hours before use.

The dope prepared above was extruded into a hollow fiber using equipment shown in FIG. 1. The fiber spinning conditions used and characteristics of the hollow fiber obtained are shown in Table 1. The dope described above was pressurized into a gear pump and was in turn extruded through an annular orifice of a spinneret into a fiber. A bore fluid with a volume ratio of N-methyl-pyrrolidone (NMP)/ polyethylene glycol (PEG)/isopropylnol (IPA) of 1:1:1, was applied in the lumen to keep the fiber hollow. The weight average molecular weight of the PEG was 400. The extruded fiber was allowed to fall freely 2.5 inches in air before reaching a coagulation bath containing water as a coagulating agent. The coagulated fiber was wrapped around a set of power-driven wheels in the coagulation bath and the first leaching bath. The bath temperature was set at 50° C.

After passing through the coagulation bath, the hollow fiber was allowed to pass through a godet station and a laser scan micrometer to measure vertically and horizontally the outside diameter of the fiber. The fiber was then collected by a take-up wheel, partially immersed in a second leaching water bath. The hollow fiber was spun at 60 ft/min. The fiber was further leached with water overnight and then preserved in a aqueous solution containing 35% by weight glycerol. Finally, it was dried in an oven at 50° C. for 24 hours. The fiber spinning conditions used are given in Table 1. All percentages throughout are percent by weight unless otherwise indicated.

TABLE 1

| Composition of Casting solution | |
|---|---|
| PS1700 | 15% |
| NMP | 65% |
| PVP | 5% |
| MA | 15% |
| Bore Fluid Composition | |
| NMP | 33.3% |
| PEG400 | 33.3% |
| IPA | 33.3% |
| Fiber spinning conditions | |
| Dope extrusion rate (ml/min) | 2 |
| Flow rate of bore fluid (water) (ml/min) | 0.73 |
| Fiber spinning speed (ft/min) | 60 |
| Gelation bath temperature (° C.) | 49 |
| Water leaching bath (1) temperature (° C.) | 45 |
| Air gap (in.) | 2.5 |

TABLE 1-continued

| Gelation bath composition | |
|---|---|
| Water | 100% |
| NMP | 0 |
| PEG400 | 0 |
| IPA | 0 |
| Fiber characteristics | |
| Fiber outside diameter (mil) | 61.2 |
| Fiber inside diameter (mil) | 33.5 |
| Membrane thickness (mil) | 14.3 |
| Tensile (psi) | 563 |
| Elongation | 53% |
| | (% elongation) |
| Pure water flux (gfd) at 20 psi | 27 |
| Red wine flux (gfd) at 20 psi | 184 |
| 525 nm Color Passage | 98.9% |

Figure 2:
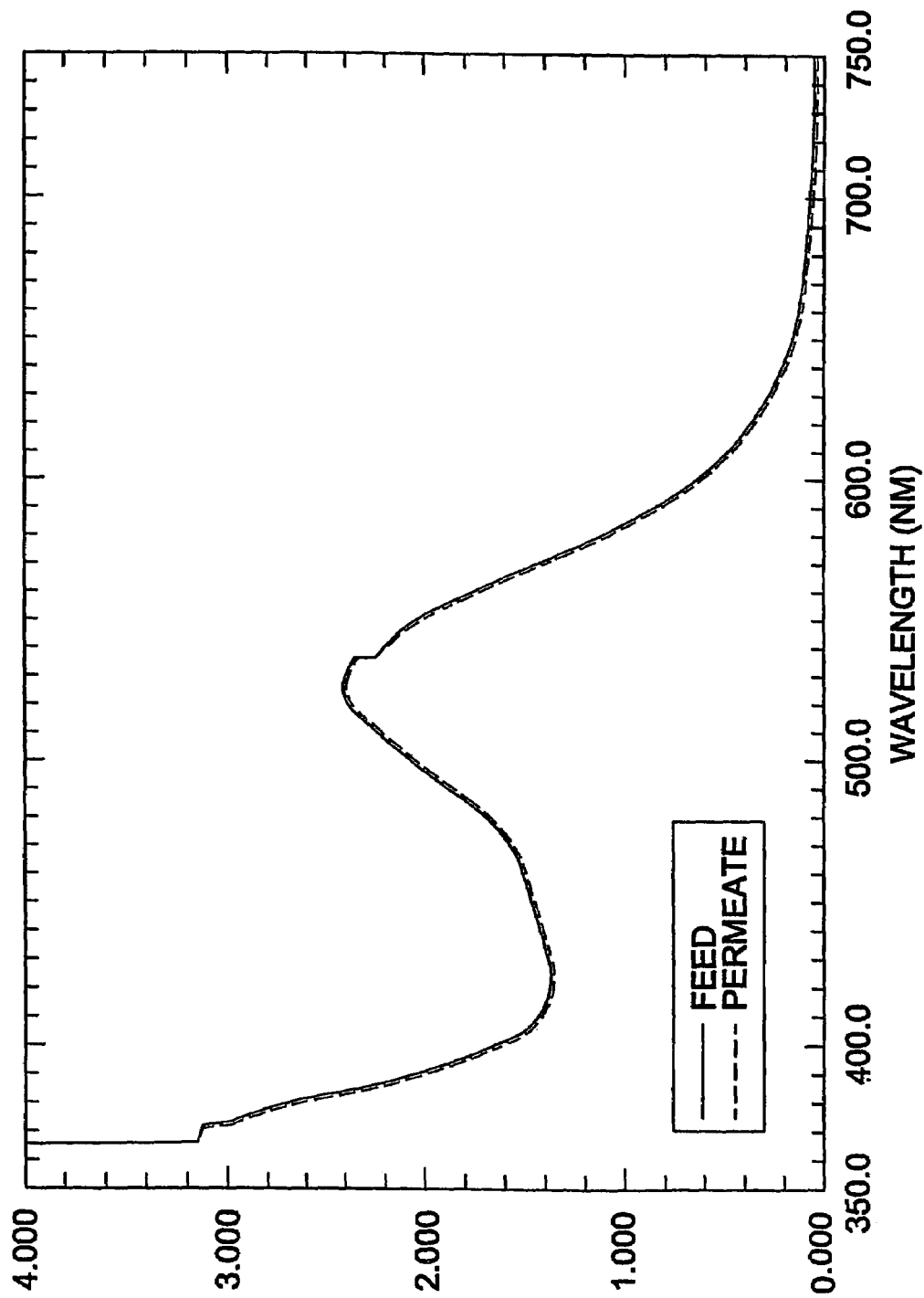
FIG. 2 is an ultra violet/visible (UV/vis) spectra of feed and permeate of a hollow fiber membrane obtained from the method of the present invention as outlined in Example 1.

The major characteristics of the hollow fiber membrane obtained in Example 1 of the present invention are displayed in Table 1. The outside diameter of the hollow fiber was 61.2 mil. The inside diameter (ID) was 33.5 mil, and the thickness was 14.3 mil. This fiber had a tensile strength of 563 psi and an elongation of 53%. The pure water flux was 27 gfd at 20 psi. The red wine flux was 184 gfd at 20 psi. Although the water flux across the membrane was very low, it was capable of passing the red pigment of Carlo Rossi Burgundy red wine with a maximum absorption at 525 nm wavelength, as shown in FIG. 2. The UV/visable (UV/vis) spectrum of both feed and permeate was almost superimposed on one another, as seen in FIG. 2.

Figure 3:
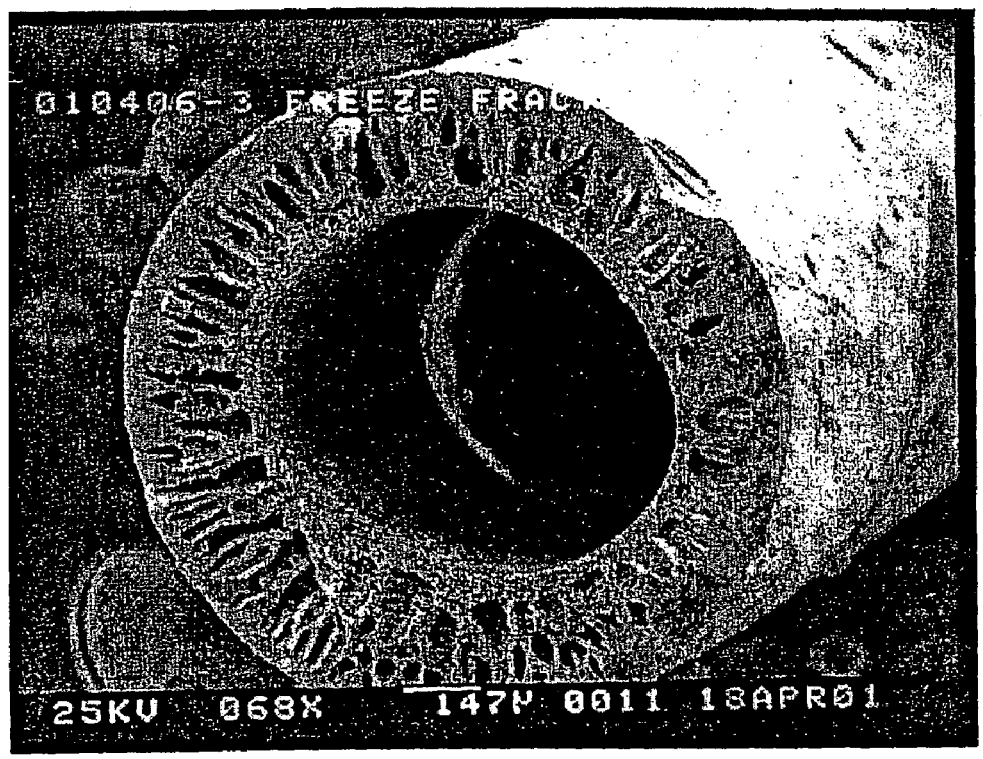
FIG. 3 is a scanning electron microphotograph of the cross section of a hollow fiber membrane obtained from the method of the present invention as outlined in Example 1.
Figure 4:
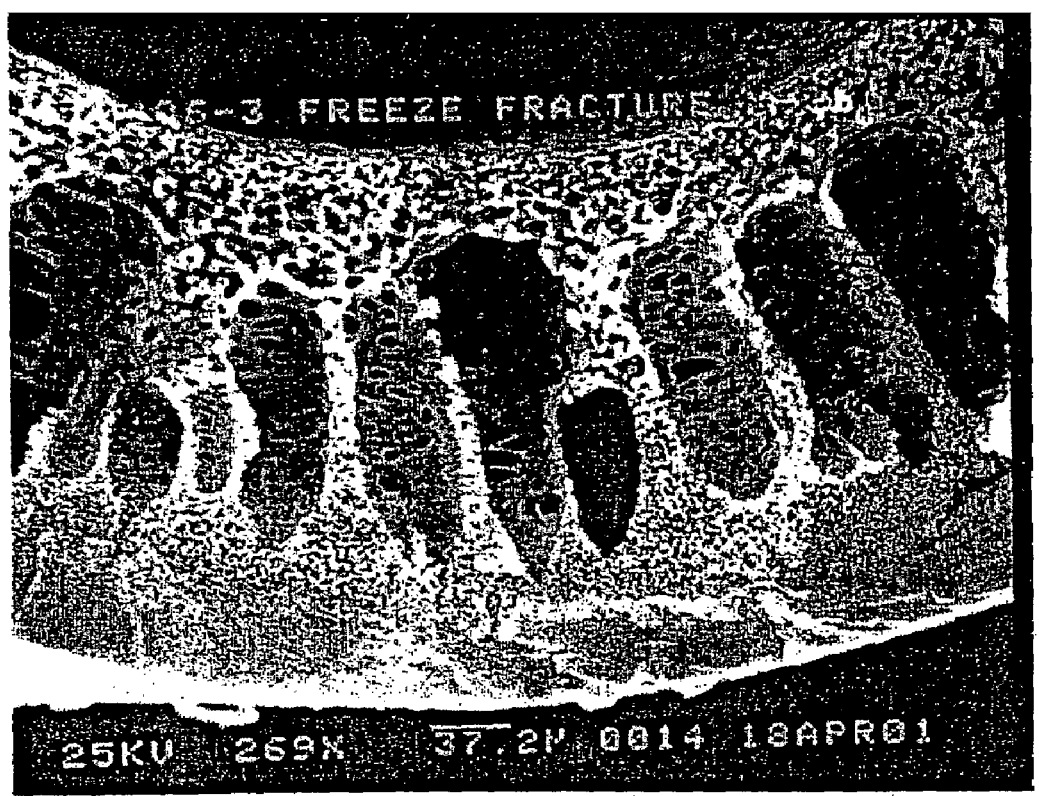
FIG. 4 is a scanning electron microphotograph of the enlarged view of the cross section of a hollow fiber membrane obtained from the method of the present invention as outlined in Example 1.
Figure 5:
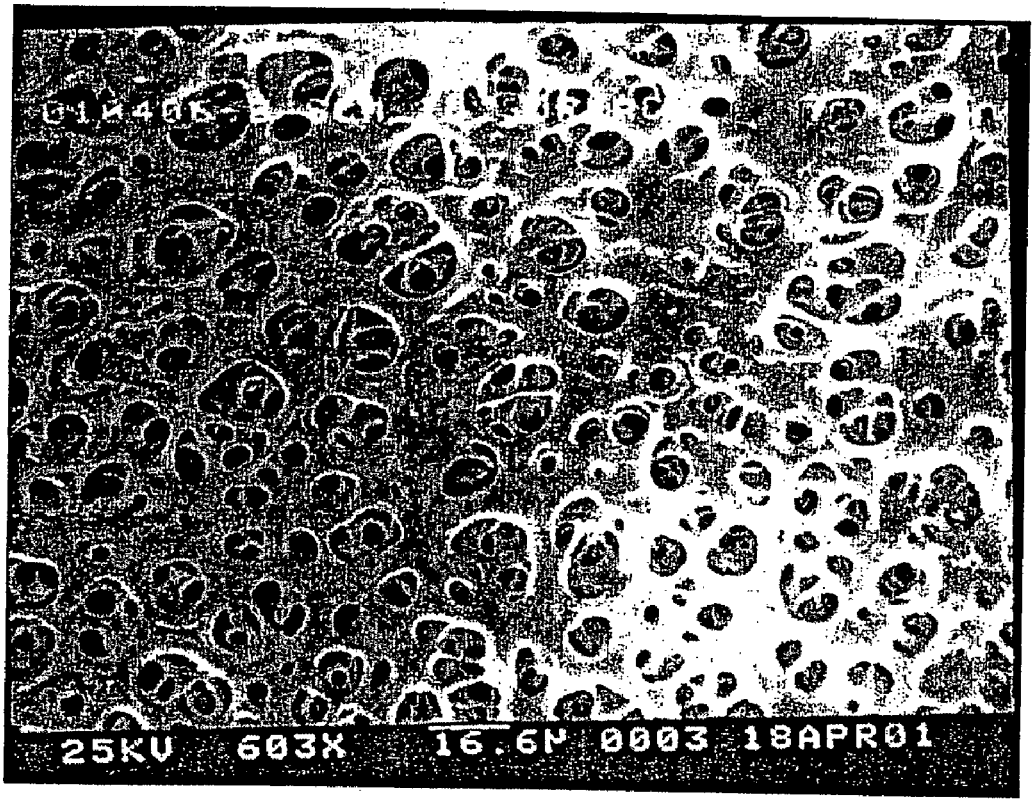
FIG. 5 is a scanning electron microphotograph of the inside surface of a hollow fiber membrane obtained from the method of the present invention as outlined in Example 1.
Figure 6:
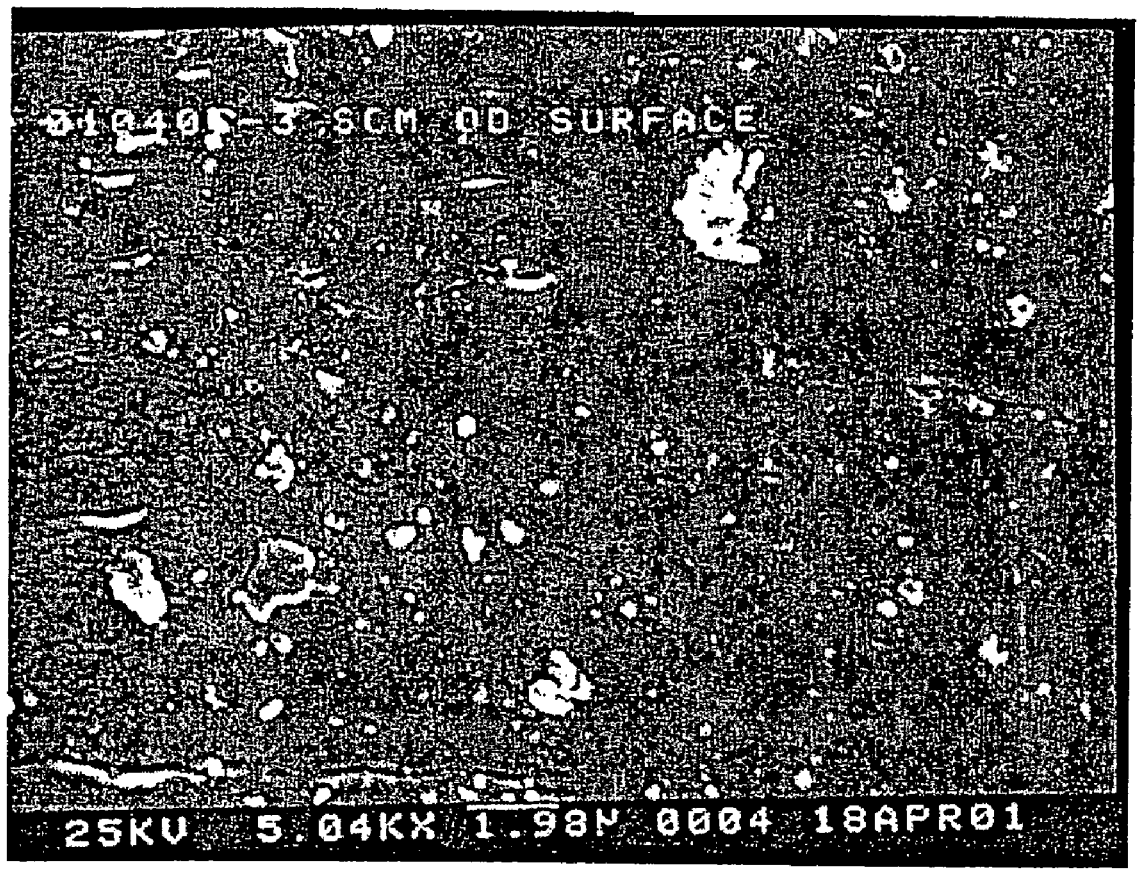
FIG. 6 is a scanning electron microphotograph of the outside surface of a hollow fiber membrane obtained from the method of the present invention as outlined in Example 1.

The morphology of the hollow fiber obtained in Example 1 was examined using a Scanning Electron Microscope (SEM). FIGS. 3, 4, 5 and 6 are microphotographs of a hollow fiber membrane obtained from Example 1. Micro pores were observed in the inside surface of the hollow fiber, as shown in FIG. 5. The outside surface was very dense, as shown in FIG. 6. There were finger-like micro voids in the cross section between a porous layer near the inner surface and a dense layer near the outer surface of the fiber, as shown in FIG. 3. Details of the structure of the membrane are shown in an enlarged view in FIG. 4.

The membrane obtained in Example 1 of the present invention was a microfiltration membrane, in spite of low water and wine flux, because red color pigments (macromolecules) in the wine could not pass through it if it had been an ultrafiltration membrane.

EXAMPLE 2

The same extrusion and spinning conditions as in Example 1 were used to prepare another hollow fiber. The composition of the casting solution was changed, as shown in Table 2. The PVP concentration was increased from 5% by weight to 10% by weight, and the N-methyl-pyrrolidone concentration was lowered by 5% compared with the previous case in Example 1. A solvent mixture, instead of water, was used as a coagulation medium. The water in the coagulation bath was replaced with a solution containing 21.9% by volume N-methyl-pyrrolidone, 21.9% by volume polyethylene glycol, 21.9% by volume isopropylnol and 34.2% by volume water. The fiber spinning conditions used are given in Table 2.

TABLE 2

| Composition of Casting solution | |
|---|---|
| PS1700 | 15% |
| NMP | 60% |
| PVP | 10% |
| MA | 15% |
| Bore Fluid Composition | |
| NMP | 33.3% |
| PEG400 | 33.3% |
| IPA | 33.3% |
| Fiber spinning conditions | |
| Dope extrusion rate (ml/min) | 10 |
| Flow rate of bore fluid (water) (ml/min) | 0.79 |
| Fiber spinning speed (ft/min) | 50 |
| Gelation bath temperature (° C.) | 40 |
| Water leaching bath (1) temperature (° C.) | 45 |
| Water leaching bath (2) temperature (° C.) | 35 |
| Air gap (in.) | 7.5 |
| Gelation bath composition | |
| Water | 34.2% |
| NMP | 21.9% |
| PEG400 | 21.9% |
| IPA | 21.9% |
| Fiber characteristics | |
| Fiber outside diameter (mil) | 51 |
| Fiber inside diameter (mil) | 37 |
| Membrane thickness (mil) | 7 |
| Tensile (psi) | 590 |
| Elongation | 92% |
| | (% elongation) |
| Pure water flux (gfd) at 20 psi | 2774 |
| Red wine flux (gfd) at 20 psi | 2049 |
| 525 nm Color Passage | 100% |

Figure 8:
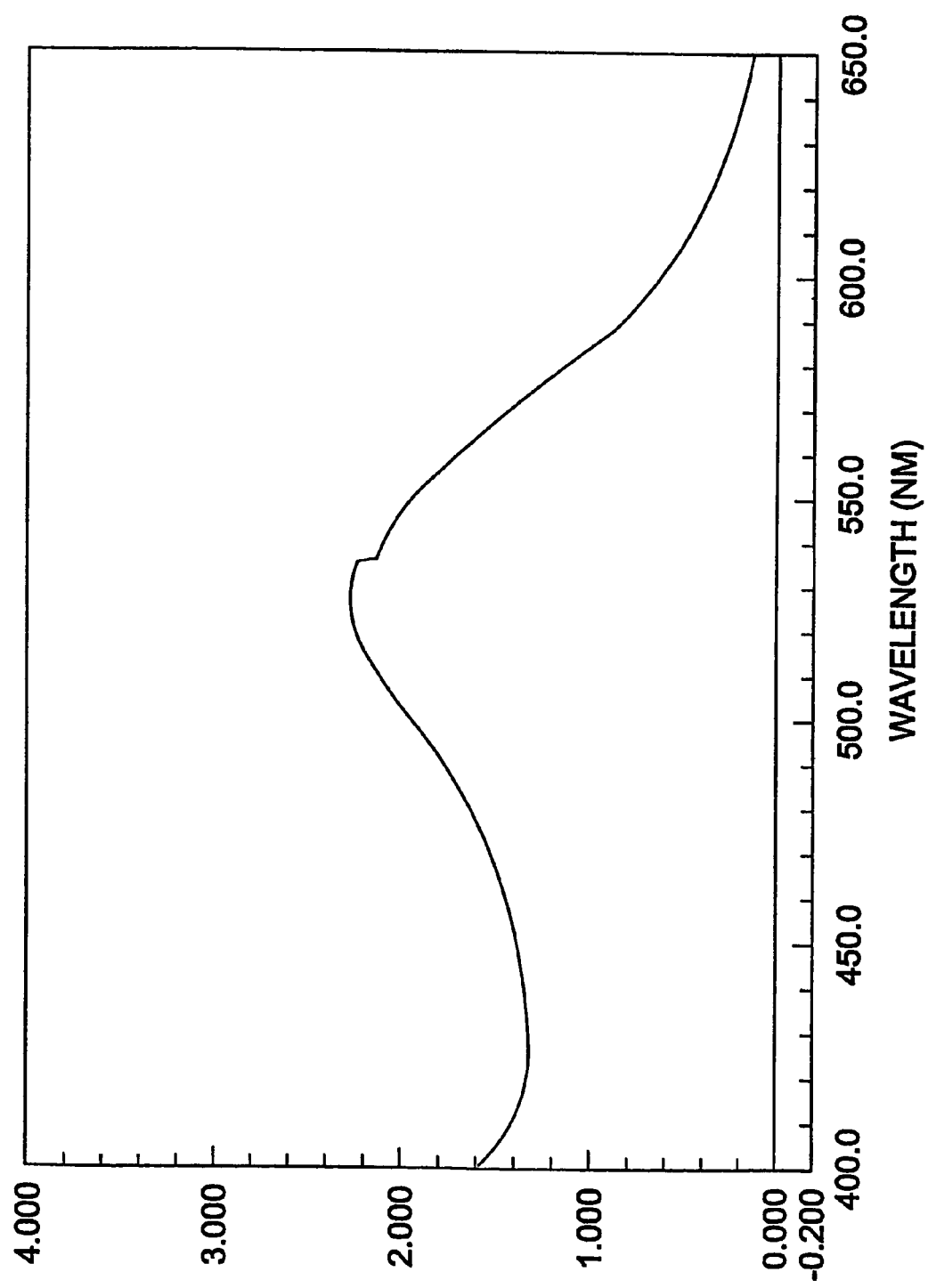
FIG. 8 is the Uv/vis spectra of feed and permeate of the hollow fiber membrane obtained from the method of the present invention as outlined in Example 2.

The major characteristics of the hollow fiber membrane obtained in Example 2 of the present invention are displayed in Table 2. The outside diameter (OD) was 51 mil, the inside diameter was 37 mil, and the thickness was 7 mil. This fiber had a tensile strength of 590 psi and an elongation of 92% at break. It had a water flux of 2774 gfd at 20 psi transmembrane pressure and a wine flux of 2049 gfd at 20 psi transmembrane pressure. The red color passage was 100% during a test using Carlo Rossi Burgundy red wine, as shown in FIG. 8. The UV/vis spectrum of the feed and permeate was identical. The two spectrums completely overlapped with one another, as shown in FIG. 8. This fiber also showed excellent performance in a test using a raw wine obtained from winery in California.

Figure 7:
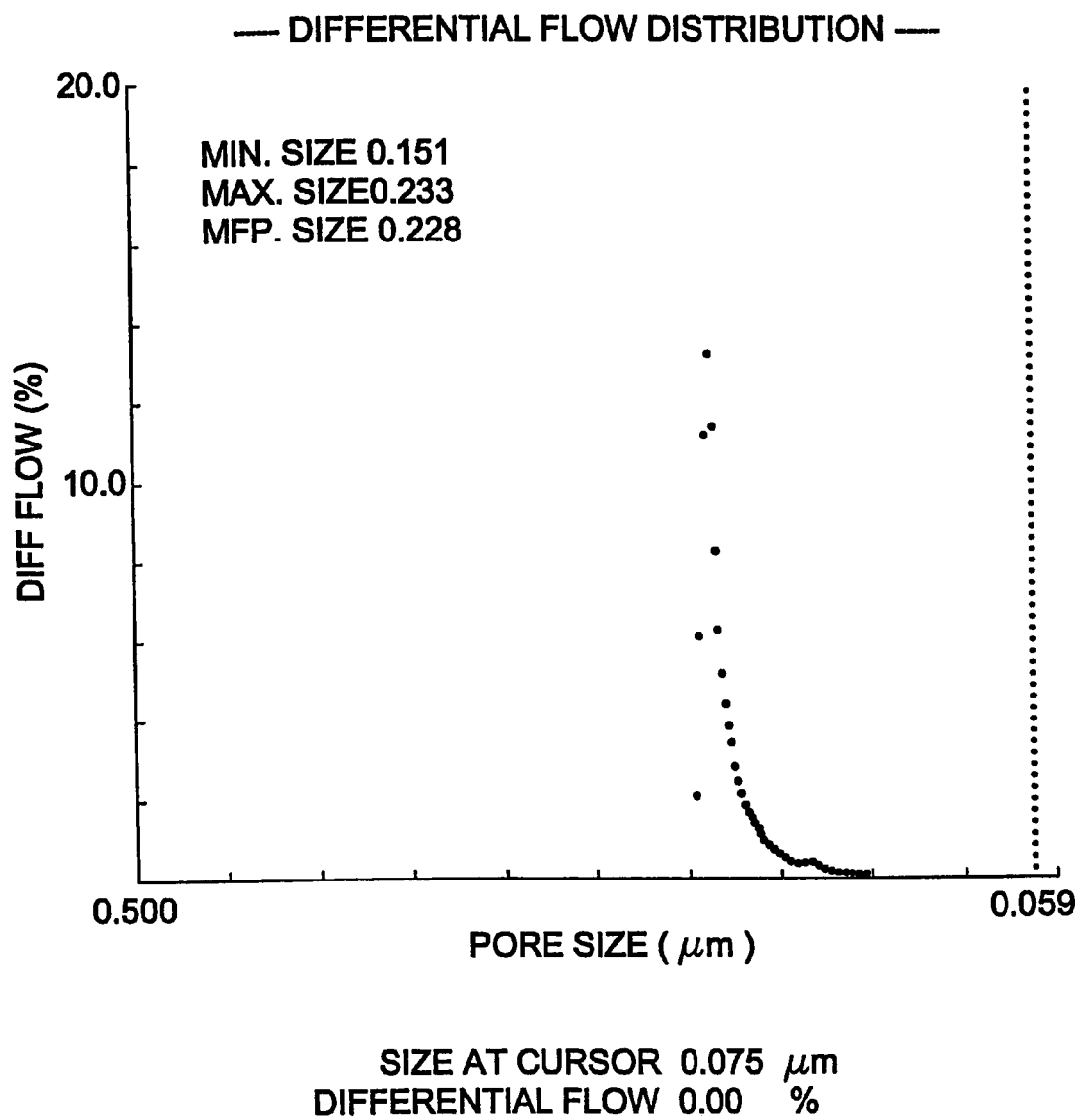
FIG. 7 is a plot showing the pore size distribution of the hollow fiber membrane obtained from the method of the present invention as outlined in Example 2.
Figure 9:
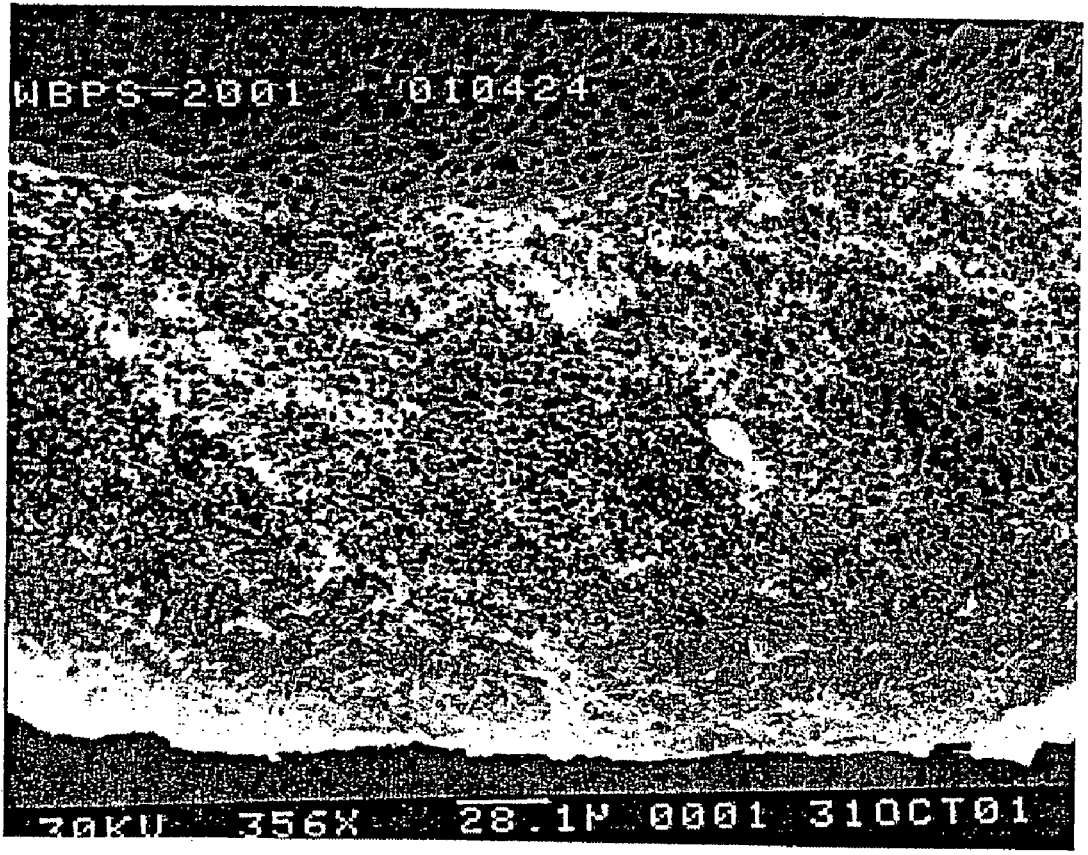
FIG. 9 is a scanning electron microphotograph of the cross section of a hollow fiber membrane obtained from the method of the present invention as outlined in Example 2.
Figure 10:
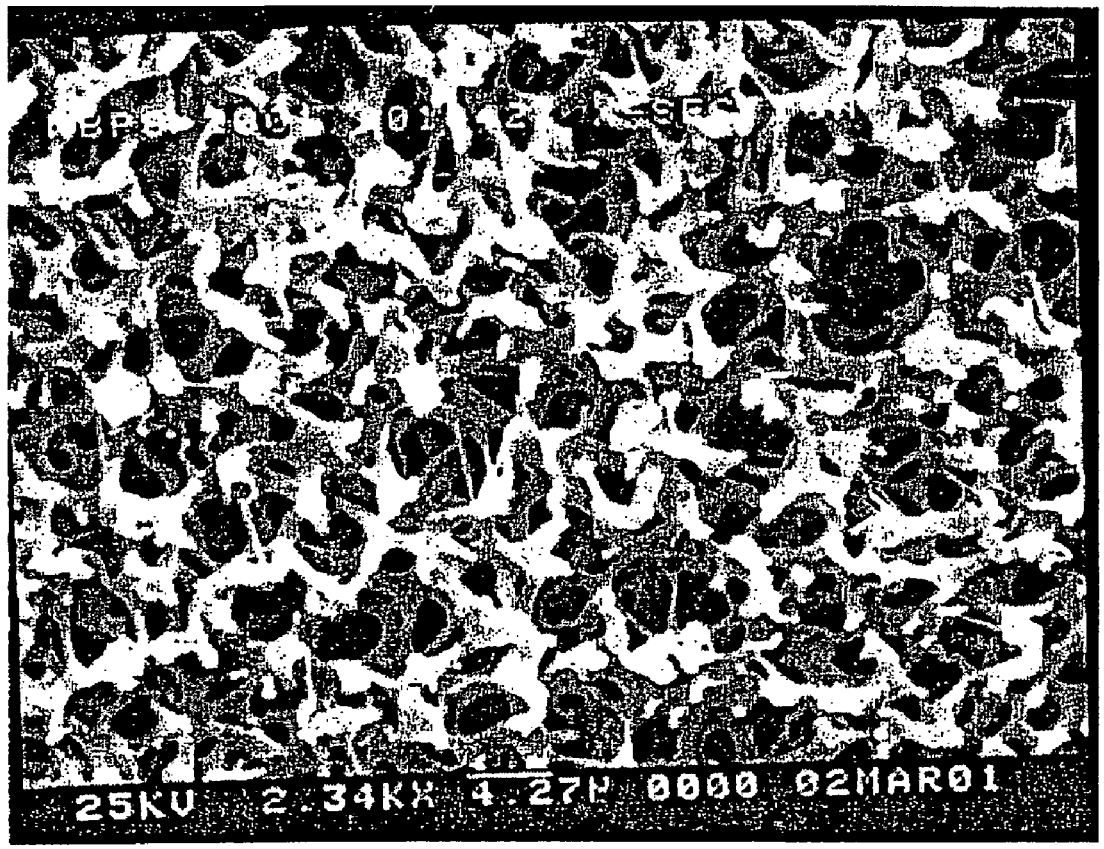
FIG. 10 is a scanning electron microphotograph of the enlarged view of the cross section of a hollow fiber membrane obtained from the method of the present invention as outlined in Example 2.
Figure 11:
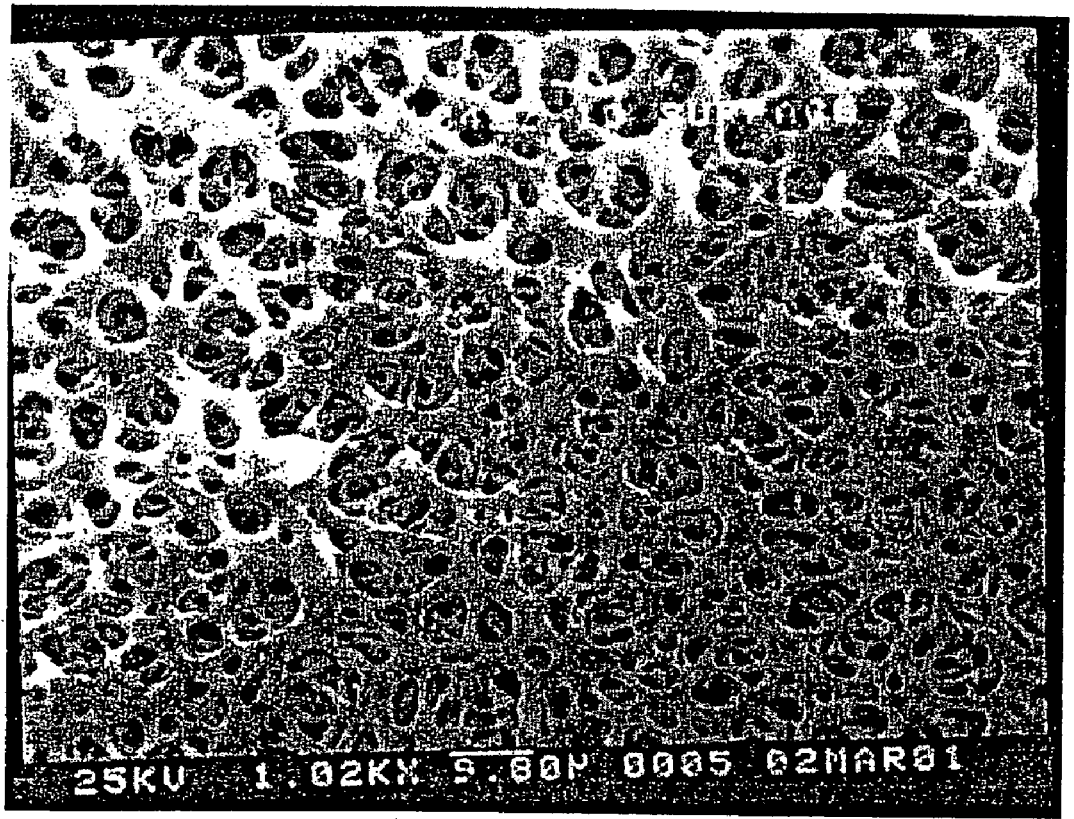
FIG. 11 is a scanning electron microphotograph of the inside surface of a hollow fiber membrane obtained from the method of the present invention as outlined in Example 2.
Figure 12:
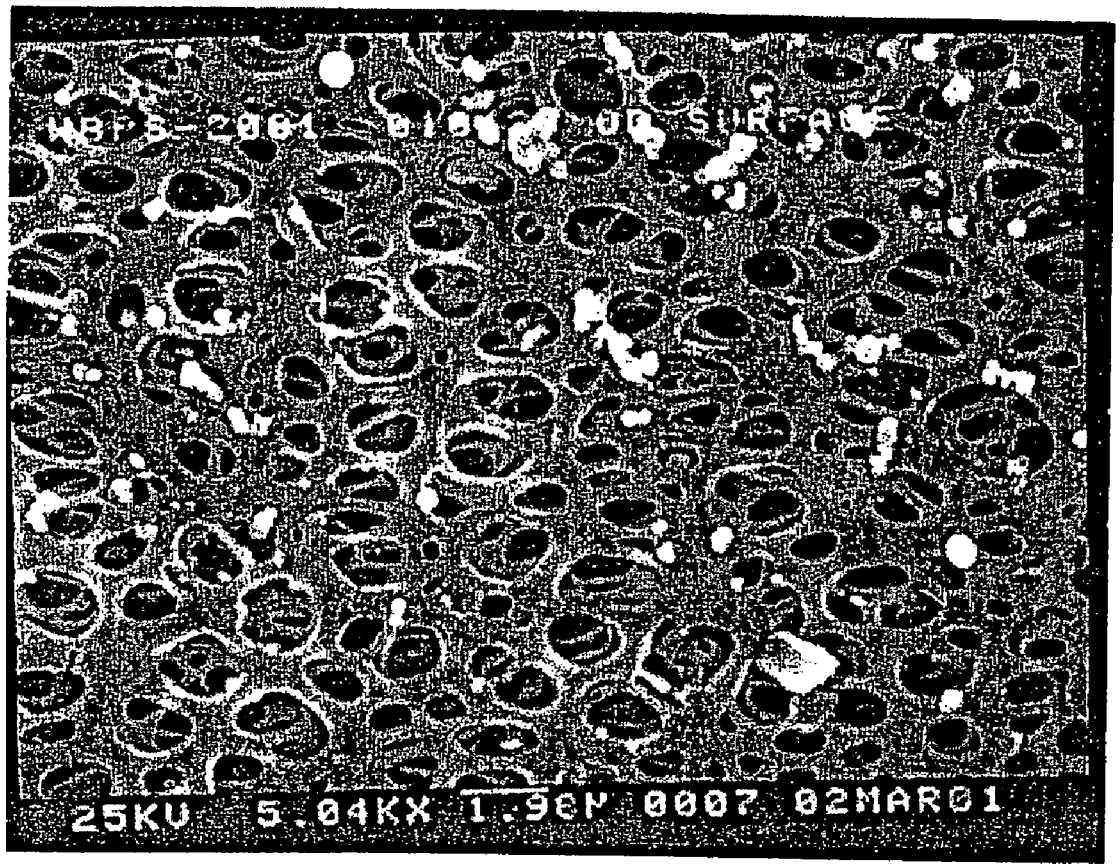
FIG. 12 is a scanning electron microphotograph of the outside surface of a hollow fiber membrane obtained from the method of the present invention as outlined in Example 2.

The fiber microfiltration membrane had micro pores on the inside surface as shown in FIG. 11 and on the outside surface as shown in FIG. 12. Further, micro pores were observed in the cross section of the hollow fiber as shown in FIG. 9 and in the enlarged view of the cross section as shown in FIG. 10. A Coulter test showed that this membrane had very narrow pore size distribution as shown in FIG. 7 with an average pore size of 0.228 micrometers. The results show that the membrane was an excellent microfiltration membrane with narrow pore size distribution for filtering wine, beverages and pharmaceuticals.

EXAMPLE 3

The same dope formulation and conditions as in Example 2 were used to prepare a hollow fiber. The total amount of dope mixed was scaled up from 5 kg to 54.48 kg., and a 20 gallon mixer was used to mix the dope. The fiber was spun at 30 ft/min using the equipment shown in FIG. 1. The bore fluid used was the same as in the previous case. An effort was made to eliminate isopropylnol from the coagulation medium because it is flammable and poses a potential danger for a large scale production. The coagulation mixture used was 34% water and 66% N-methyl-pyrrolidone. The fiber spinning conditions used are given in Table 3.

TABLE 3

| Composition of Casting solution | |
|---|---|
| PS1700 | 15% |
| NMP | 60% |
| PVP | 10% |
| MA | 15% |
| Bore Fluid Composition | |
| NMP | 33.3% |
| PEG400 | 33.3% |
| IPA | 33.3% |
| Fiber spinning conditions | |
| Dope extrusion rate (ml/min) | 10 |
| Flow rate of bore fluid (water) (ml/min) | 0.79 |
| Fiber spinning speed (ft/min) | 30 |
| Gelation bath temperature (° C.) | 50 |
| Water leaching bath (1) temperature (° C.) | 50 |
| Water leaching bath (2) temperature (° C.) | 50 |
| Air gap (in.) | 1.5 |
| Gelation bath composition | |
| Water | 34% |
| NMP | 66% |
| PEG400 | 0 |
| IPA | 0 |
| Fiber characteristics | |
| Fiber outside diameter (mil) | 75.4 |
| Fiber inside diameter (mil) | 48.4 |
| Membrane thickness (mil) | 13.5 |
| Tensile (psi) | 540 |
| Elongation | 68% |
| | (% elongation) |
| Pure water flux (gfd) at 17 psi | 3994 |
| Red wine flux (gfd) at 17 psi | 3010 |
| 525 nm Color Passage | 100% |
| Poly(ethylene oxide) flux (gfd) at 20 psi | 1292 |
| Poly(ethylene oxide), M. W. 8,000,000 Dalton | 100% passage |

Figure 14:
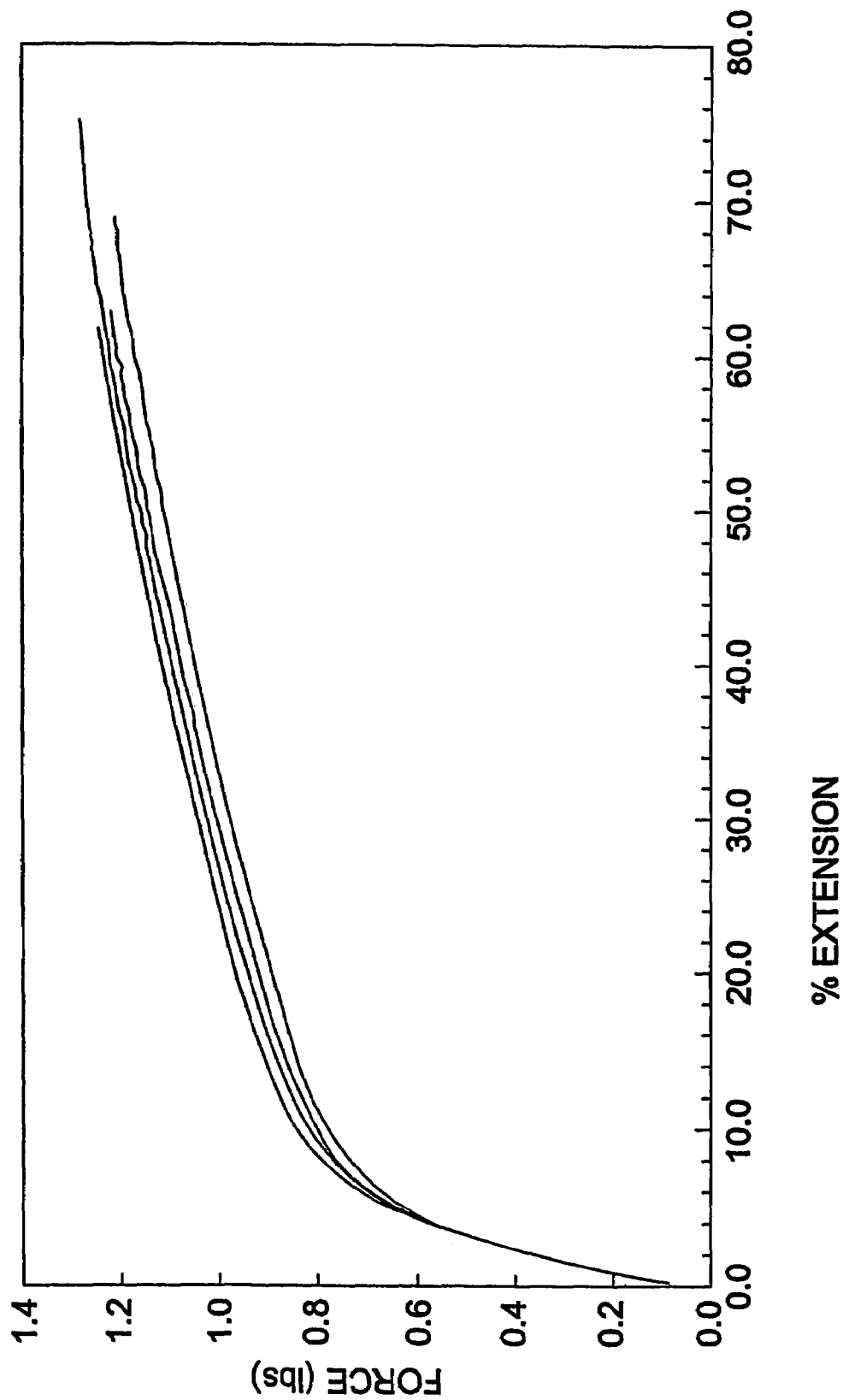
FIG. 14 is a plot showing the mechanical properties of four samples of a hollow fiber membrane obtained from the method of the present invention as outlined in Example 3.

The major characteristics of the hollow fiber membrane obtained in Example 3 of the present invention are displayed in Table 3. The fiber obtained had an outside diameter of 75.4 mil, an inside diameter of 48.4 mil, and a wall thickness of 13.5 mi. The mechanical properties of four different samples of the hollow fiber membrane obtained in Example 3 are characterized in FIG. 14. The fiber membrane obtained was very uniform and had a tensile strength of 540 psi and elongation of 68%.

The membrane showed a water flux of 3994 gfd and a wine flux of 3010 gfd, respectively, at 17 psi transmembrane pressure when tested with a single loop of a fiber membrane sample. The red color passage (525 nm) was 100%. A further test with 250 ppm poly(ethylene oxide) (weight average M.W. 8,000,000 Dalton) aqueous solution showed that the flux was 1292 gfd at 20 psi, and the passage of an 8,000,000 Dalton poly(ethylene oxide) weight average molecular weight marker through the membrane was 100%.

Figure 13:
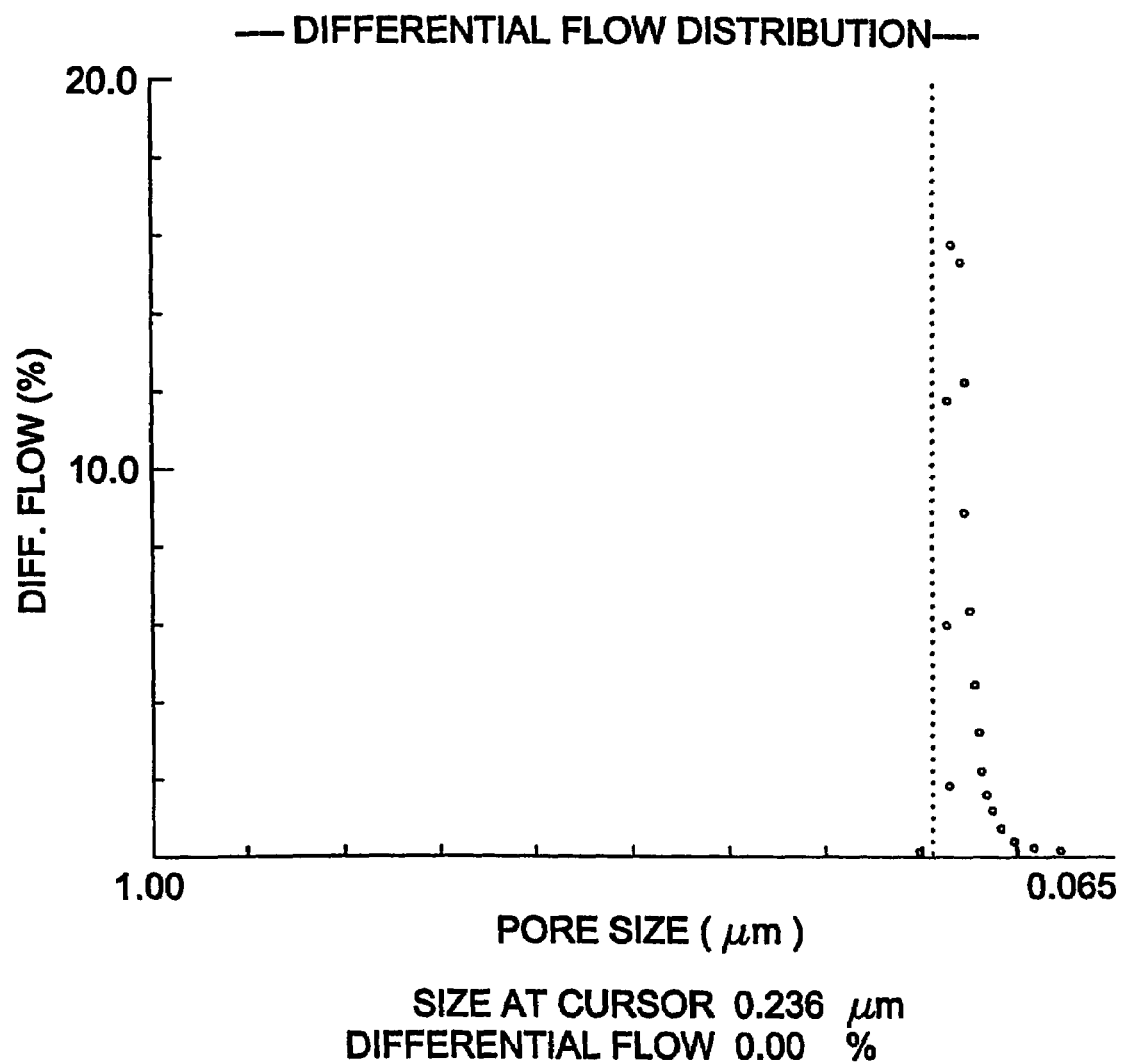
FIG. 13 is a plot showing the pore size distribution of a hollow fiber membrane obtained from the method of the present invention as outlined in Example 3.
Figure 20:
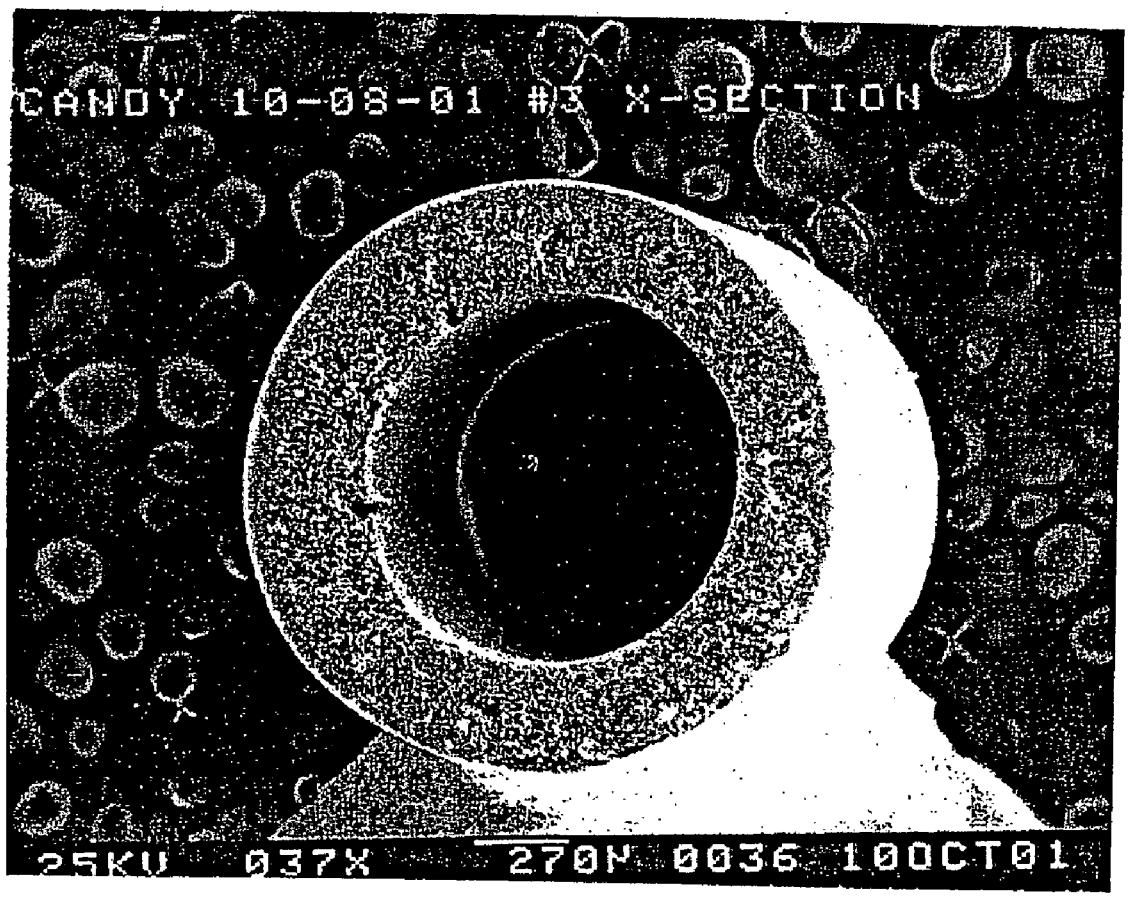
FIG. 20 is a scanning electron microphotograph of the cross section of a hollow fiber membrane obtained from the method of the present invention as outlined in Example 3.
Figure 21:
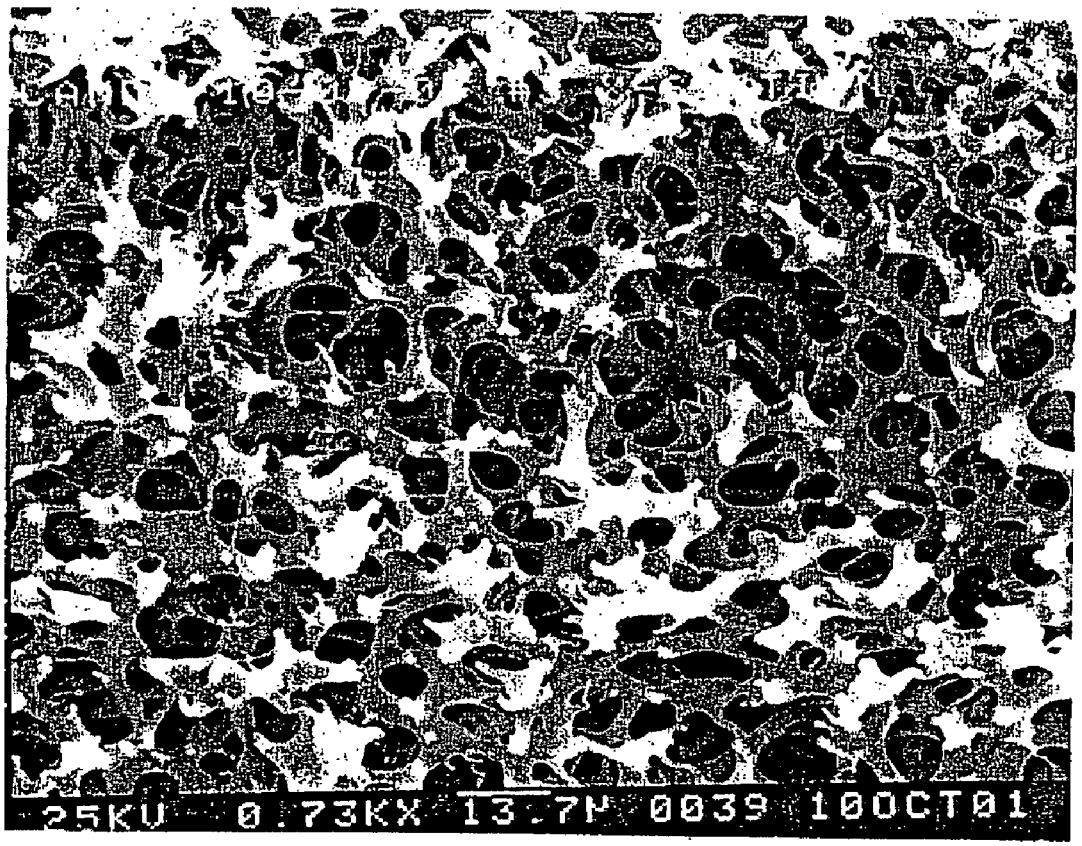
FIG. 21 is a scanning electron microphotograph of the enlarged view of the cross section of a hollow fiber membrane obtained from the method of the present invention as outlined in Example 3.
Figure 22:
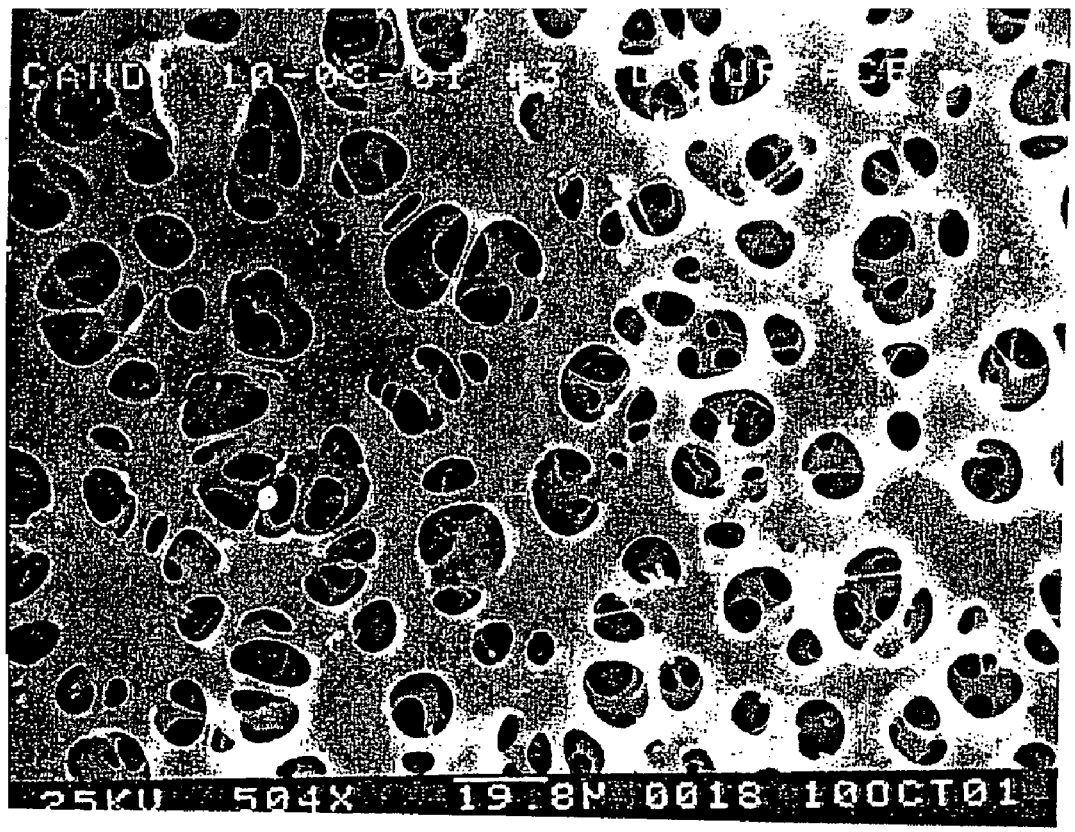
FIG. 22 is a scanning electron microphotograph of the inside surface of a hollow fiber membrane obtained from the method of the present invention as outlined in Example 3.
Figure 23:
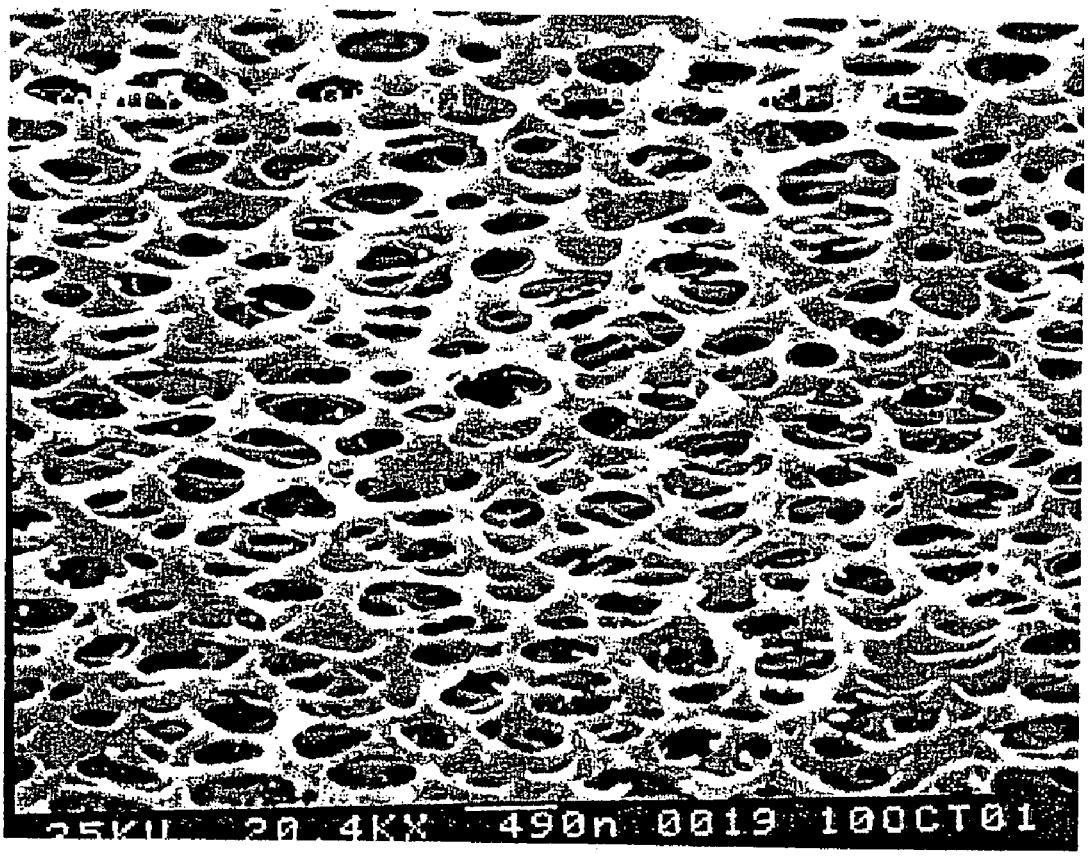
FIG. 23 is a scanning electron microphotograph of the outside surface of a hollow fiber membrane obtained from the method of the present invention as outlined in Example 3.

These membrane performances were consistent with the membrane structure examined with SEM as shown in FIG. 20–23 and with the membrane pore size and pore size distribution as shown in FIG. 13. Micro pores were observed in the inside surface as shown in FIG. 22 and in the outside surfaces as shown in FIG. 23. Further, micro pores were observed in the cross section of the membrane, as shown in FIG. 20 and FIG. 21. The pore size distribution observed in FIG. 13 was very narrow. These results show that the hollow fiber membranes obtained in Example 3 were excellent microfiltration membranes.

Figure 15:
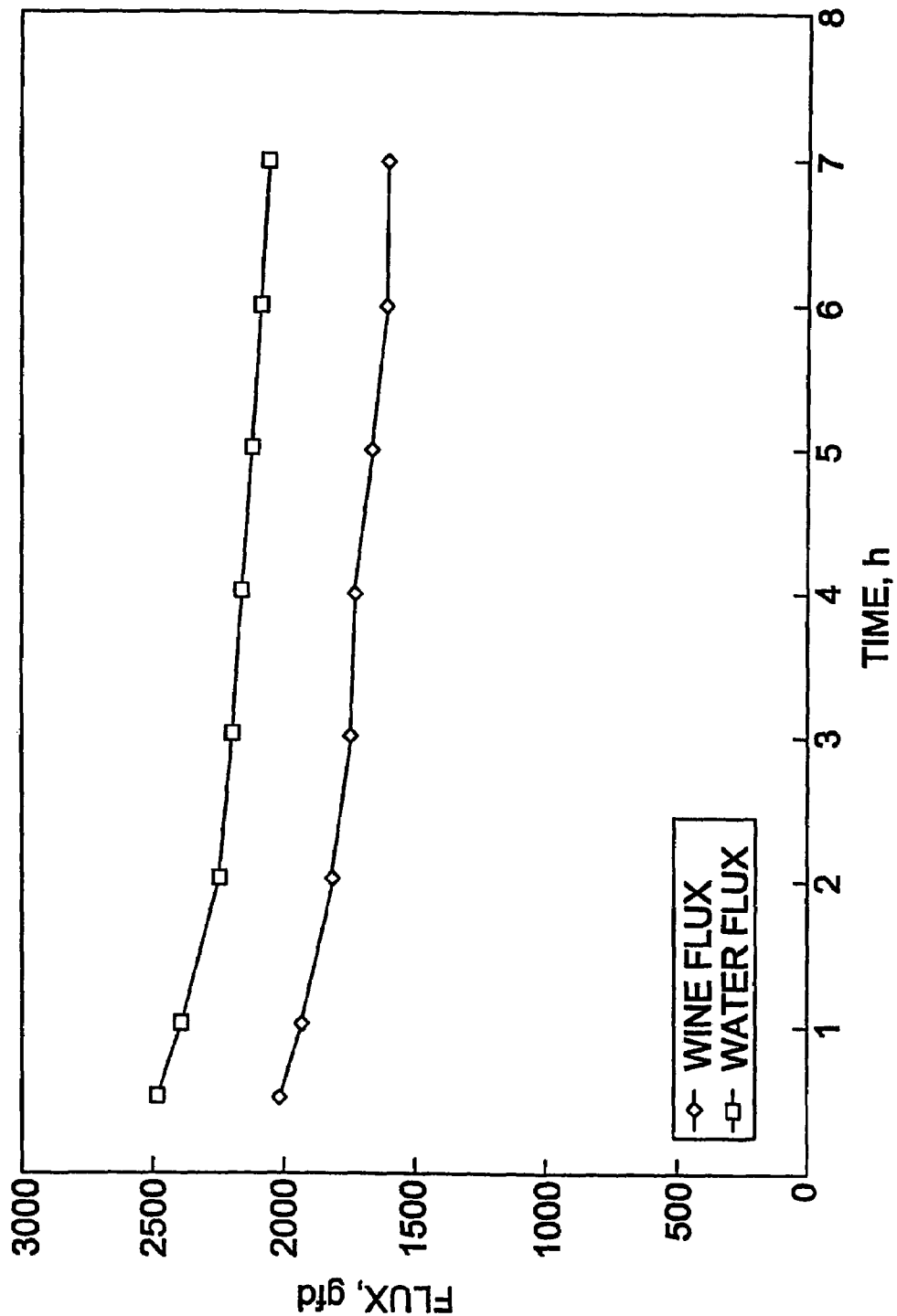
FIG. 15 is a plot showing the water and wine flux of Carlo Rossi Burgundy red wine as a function of time with a 1"×16" cartridge of a hollow fiber membrane as obtained from the method of the present invention as outlined in Example 3.
Figure 16:
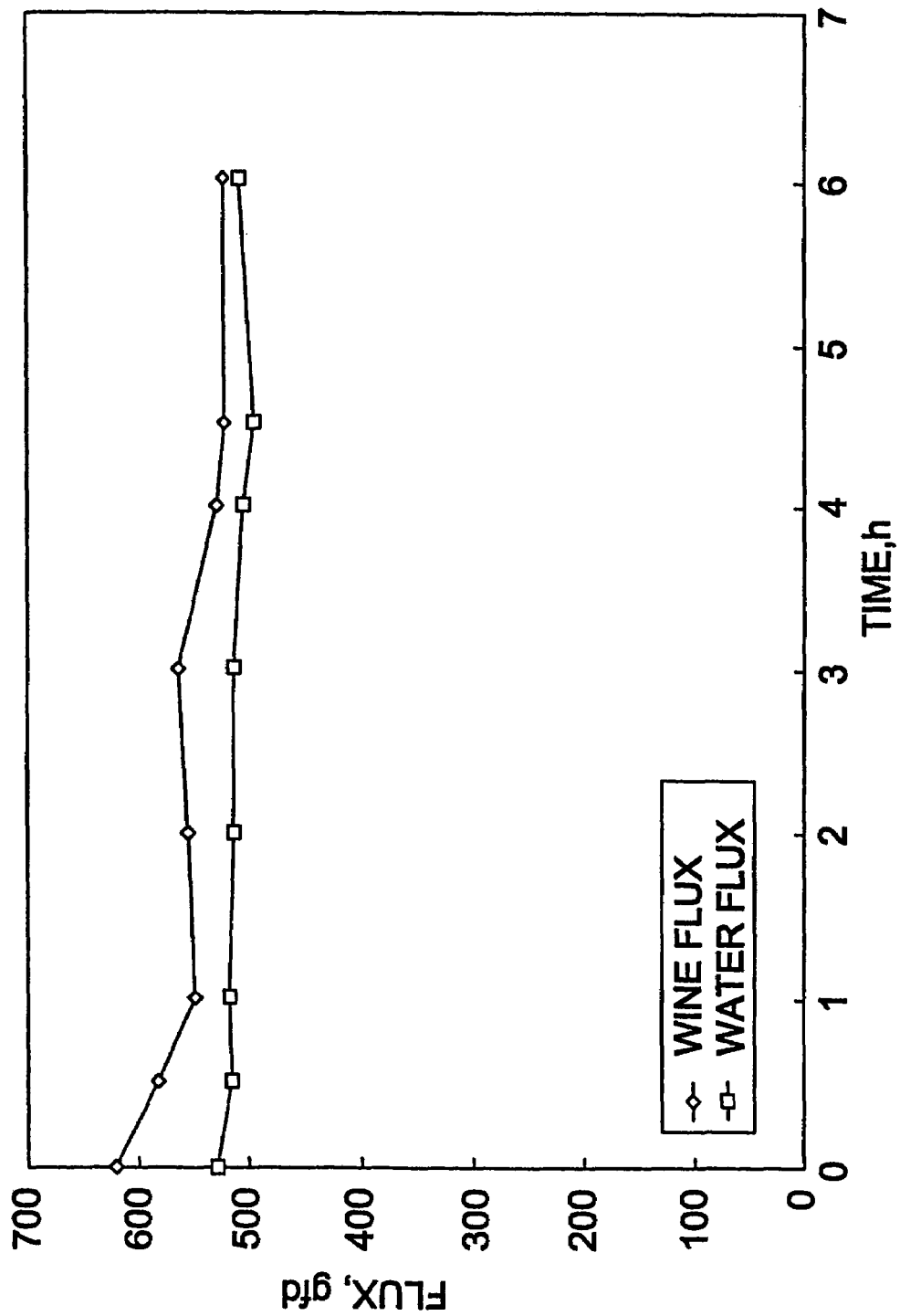
FIG. 16 is a plot showing the water and wine flux of a Carlo Rossi Burgundy red wine as a function of time tested with a 5"×60" cartridge of a hollow fiber membrane as obtained from the method of the present invention as outlined in Example 3.

A single loop test showed that this membrane had a water and wine flux of 3994 and 3010 gfd, respectively, at 17 psi transmembrane pressure, as shown in Table 3. Tested with a 1"×16" cartridge, the membrane showed a stabilized water flux of 2100 gfd and a wine flux of 1600 gfd, respectively, at 15 psi transmembrane pressure, as shown in FIG. 15. Tested with a 5"×60" cartridge, the membrane showed a stabilized wine flux of 500 gfd at 6.5 psi transmembrane pressure, as shown in FIG. 16. Lower fluxes observed in the tests with 1"×16" and 5"×60" cartridges, respectively, compared with the flux of a single loop of hollow fiber membrane were caused by additional heating and drying of the fibers and by the difference in efficiency of mass transfer for different systems.

Figure 17:
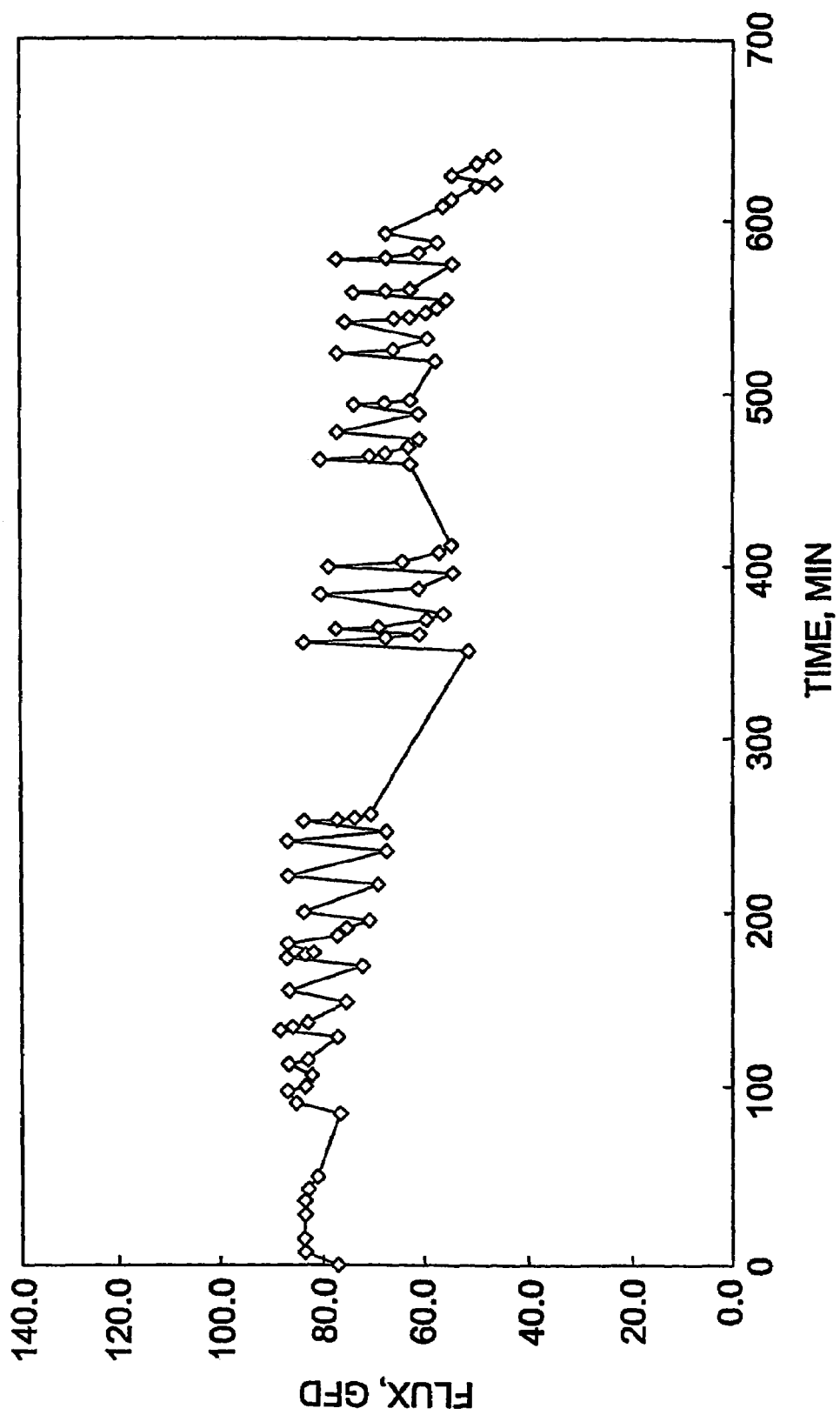
FIG. 17 is a plot showing the wine flux of raw wine from a winery in California as a function of time tested with two (2) 5"×60" cartridges of a hollow fiber membrane as obtained from the method of the present invention as outlined in Example 3.

A test with two (2) 5"×60" cartridges of raw red wine, obtained from a winery in California, having a turbidity of 503 NTU as a feed, showed a stabilized wine flux of 65 gfd at a transmembrane pressure of 2.5 to 11 psi, as shown in FIG. 17. The turbidity of the filtered wine was 0.33 NTU and the quality of the filtered wine was excellent.

Figure 18:
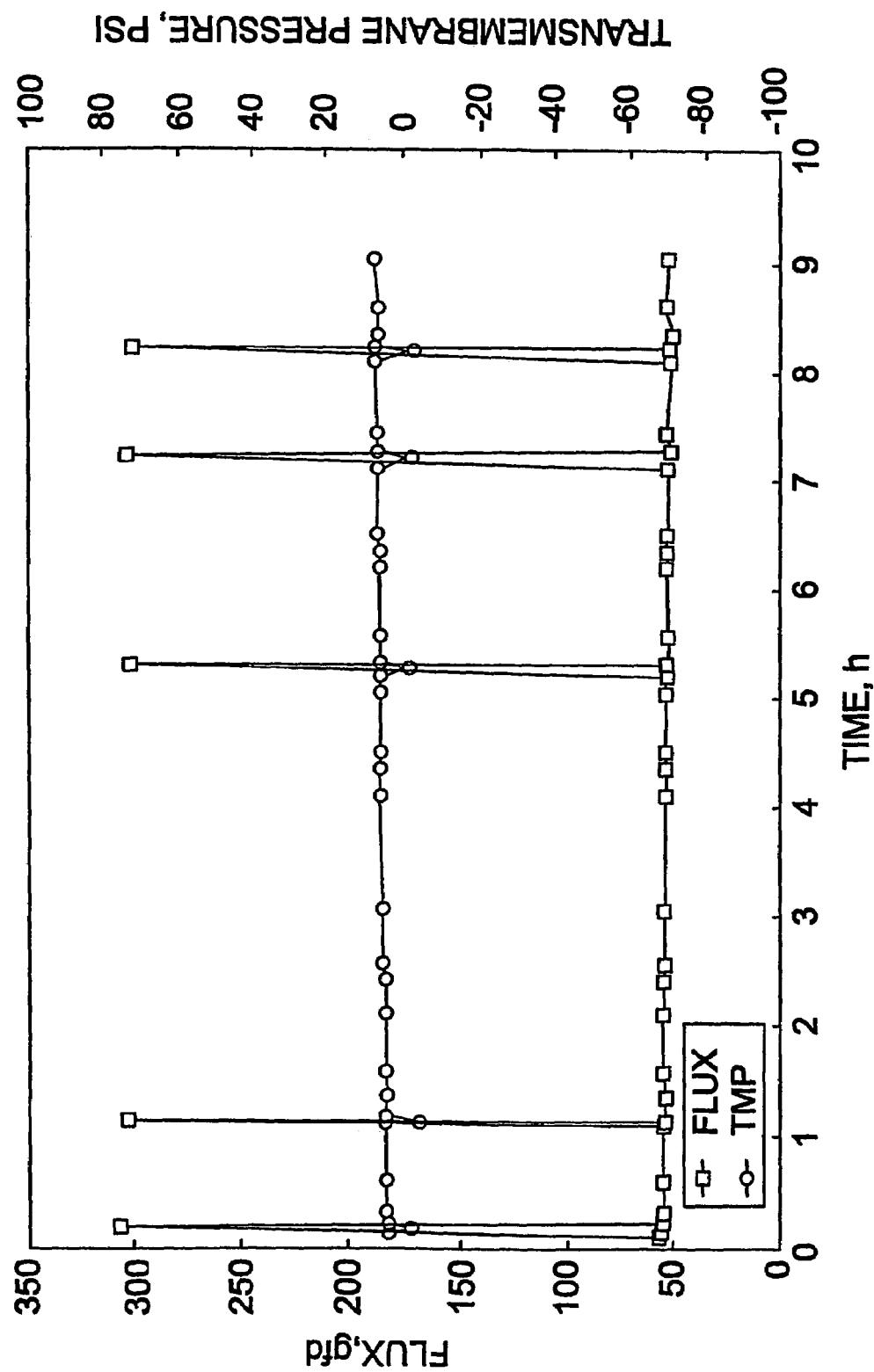
FIG. 18 is a plot showing the flux and transmembrane pressure of raw Pays D'oc white wine from a French winery as a function of time tested with two (2) 5"×60" cartridges of a hollow fiber membrane as obtained from the method of the present invention as outlined in Example 3.

In France, a test was conducted with Pays D'oc white wine as a feed using a system equipped with two (2) 5"×60" cartridges. The major result obtained is shown in FIG. 18. A wine flux as high as 55 gfd was achieved at a very low transmembrane pressure of 8 psi. The quality of the filtered wine was excellent. The peaks of flux in FIG. 18 represent back pulses applied to clean the membrane.

EXAMPLE 4

Using the equipment shown in FIG. 1, a hollow fiber membrane was spun at 12 ft/min. The bore fluid used was the same as in the previous cases. The hollow fiber membrane of Example 4 was spun at a lower speed than the membrane of Example 3. The fiber spinning conditions used are given in Table 4.

TABLE 4

| Composition of Casting solution | |
|---|---|
| PS1700 | 15% |
| NMP | 60% |
| PVP1,300,000 | 10% |
| MA | 15% |
| Bore Fluid Composition | |
| NMP | 33.3% |
| PEG400 | 33.3% |
| IPA | 33.3% |
| Fiber spinning conditions | |
| Dope extrusion rate (ml/min) | 10 |
| Flow rate of bore fluid (water) (ml/min) | 0.79 |
| Fiber spinning speed (ft/min) | 12 |
| Gelation bath temperature (° C.) | 50 |
| Water leaching bath (1) temperature (° C.) | 50 |
| Water leaching bath (2) temperature (° C.) | 50 |
| Air gap (in.) | 1.25 |
| Gelation bath composition | |
| Water | 40% |
| NMP | 60% |
| PEG400 | 0 |
| IPA | 0 |

TABLE 4-continued

Fiber characteristics

| | |
|---|---|
| Fiber outside diameter (mil) | 123.8 |
| Fiber inside diameter (mil) | 81.6 |
| Membrane thickness (mil) | 21.1 |
| Tensile (psi) | 452.5 |
| Elongation | 39.3% (% elongation) |
| Pure water flux (gfd) at 20 psi | 5027 |
| Red wine flux (gfd) at 20 psi | 4380 |
| 525 nm Color Passage | 100% |

The major characteristics of the hollow fiber membrane obtained in Example 4 are displayed on Table 4. The outside diameter of the hollow fiber was 123.8 mil, the inside diameter was 81.6 mil, and the thickness was 21.2 mil. This fiber had a tensile strength of 452.5 psi and an elongation of 39.3%. The pure water flux was 5027 gfd at 20 psi. The red wine flux was 4380 gfd at 20 psi. The red color passage (525 nm) was 100%, as shown in Table 4.

Figure 24:
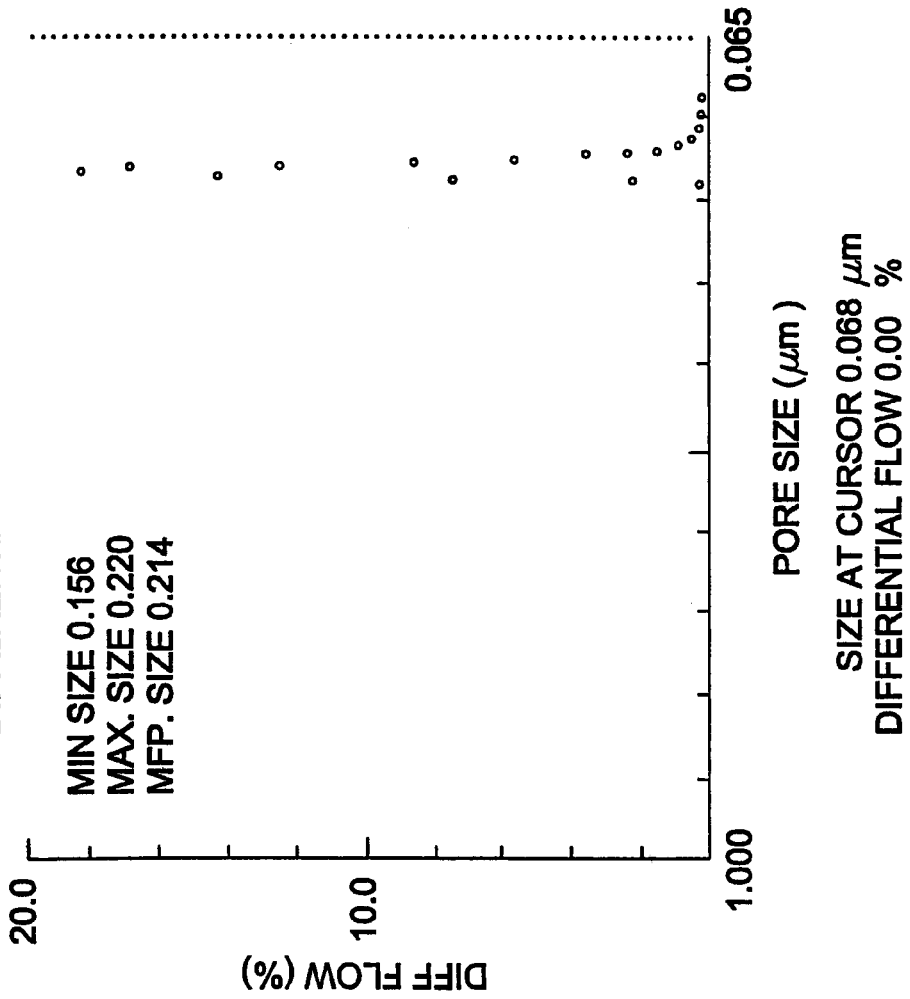
FIG. 24 is plot showing the pore size distribution of a hollow fiber membrane obtained from the method of the present invention as outlined in Example 4.
Figure 25:
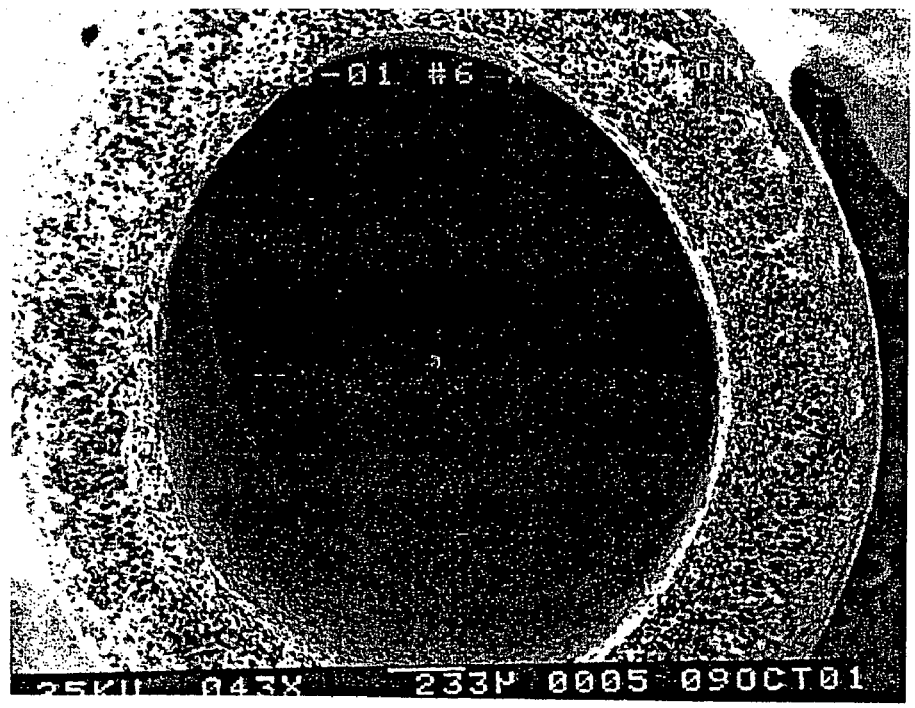
FIG. 25 is a scanning electron microphotograph of the cross section of a hollow fiber membrane obtained from the method of the present invention as outlined in Example 4.
Figure 26:
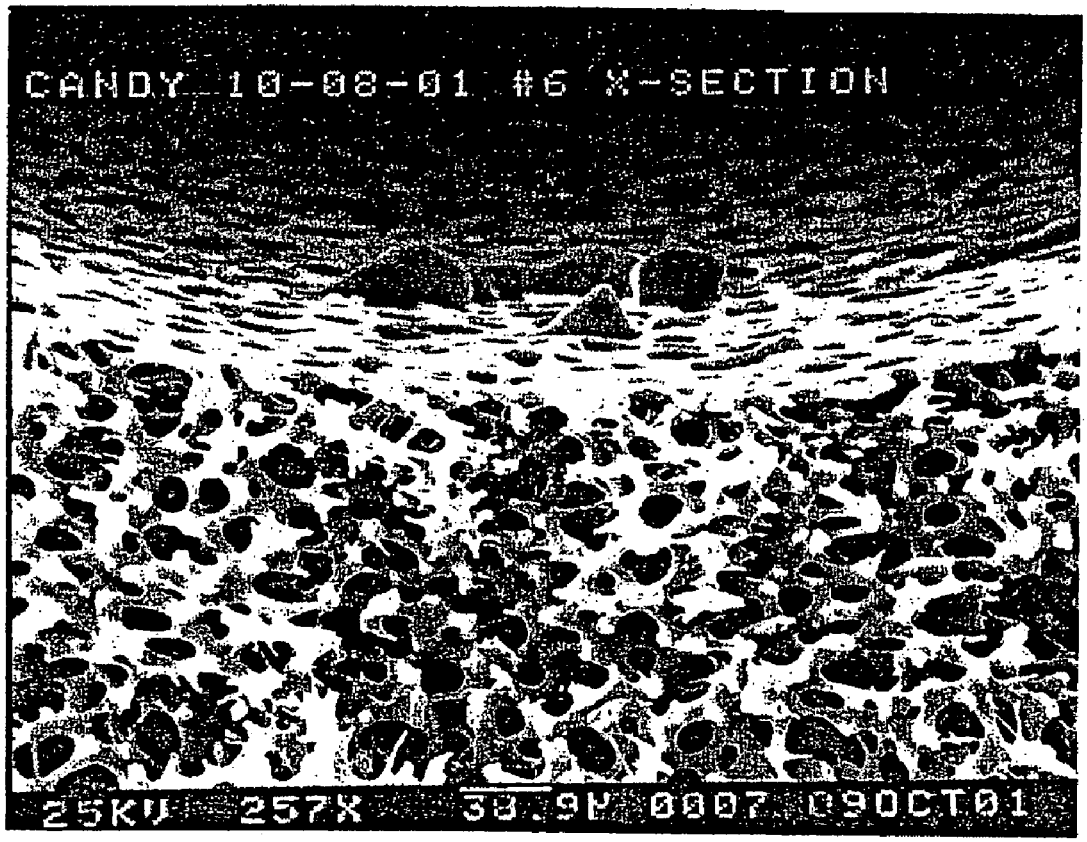
FIG. 26 is a scanning electron microphotograph of the enlarged view of the cross section of a hollow fiber membrane obtained from the method of the present invention as outlined in Example 4.
Figure 27:
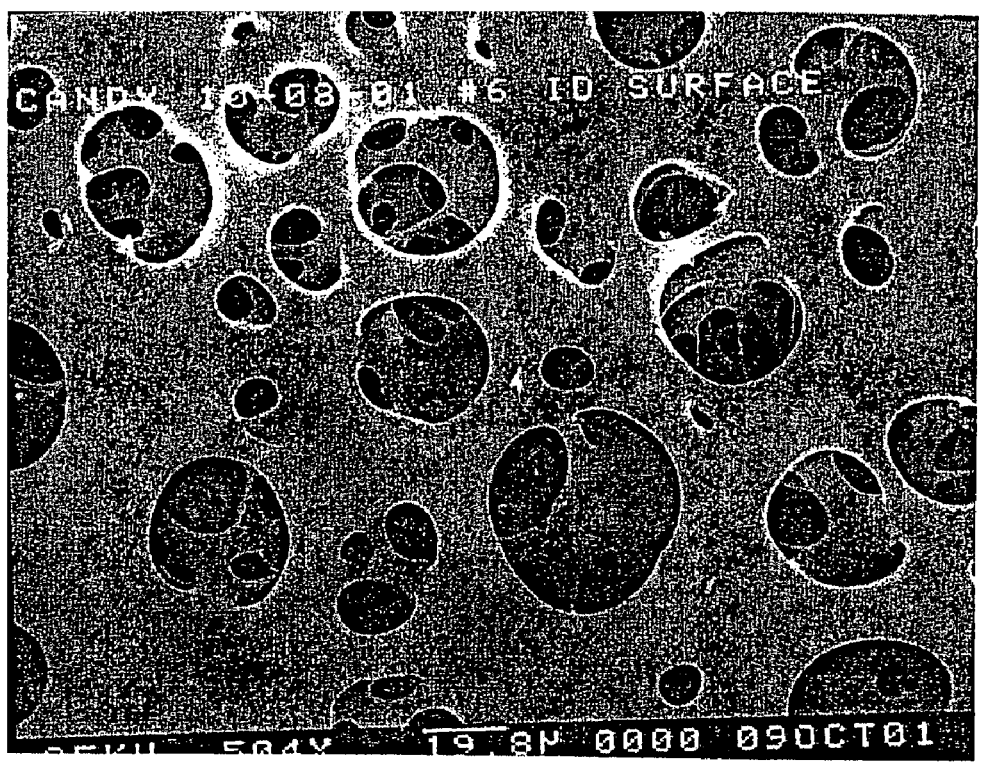
FIG. 27 is a scanning electron microphotograph of the inside surface of a hollow fiber membrane obtained from the method of the present invention as outlined in Example 4.
Figure 28:
FIG. 28 is a scanning electron microphotograph of the outside surface of a hollow fiber membrane obtained from the method of the present invention as outlined in Example 4.

The lower spinning speed resulted in an increase in both the water and wine flux. These results were consistent with the membrane structure as seen in SEM microphotographs shown in FIGS. 25–28. Micro pores at the inside surface of the fiber as shown in FIG. 27 were much larger than those of the previous example. The pores of the cross section, as shown in FIG. 25 and FIG. 26, were also larger than those of the membrane of Example 3. However, a narrow pore size distribution, similar to Example 3, was obtained, as shown in FIG. 24. The narrow pore size distribution indicates the membrane was a microfiltration membrane.

EXAMPLE 5

To a 2 gallon Myers mixer, 3000 grams of N-methyl-pyrrolidone (NMP) were added. Next, 750 grams of PVDP and 500 grams of PVP were added while stirring. The mixture was stirred at 60° C. at about 1000 rpm until it formed a homogenous mixture. The mixture was cooled to ambient temperature. Then, 750 grams of maleic anhydride (MA) were added to the mixture. This mixture was stirred at ambient temperature until it formed a homogenous viscous solution, then it was degassed under a vacuum to give a viscous dope. The dope was transferred to a 5 gallon storage tank and was allowed to stand still at ambient temperature for at least 24 hours before use. The hollow fiber was prepared in the same way as in Example 1. The fiber spinning conditions used are shown in Table 5.

TABLE 5

Composition of Casting solution

| | |
|---|---|
| PVDF, SOLEF 1015/1001 | 15% |
| NMP | 60% |
| PVP1,300,000 | 10% |
| MA | 15% |
| Bore Fluid Composition | |
| NMP | 33.3% |
| PEG400 | 33.3% |
| IPA | 33.3% |
| Fiber spinning conditions | |
| Dope extrusion rate (ml/min) | 4 |
| Flow rate of bore fluid (water) (ml/min) | 0.79 |
| Fiber spinning speed (ft/min) | 25 |
| Gelation bath temperature (° C.) | 45–50 |

TABLE 5-continued

| | |
|---|---|
| Water leaching bath (1) temperature (° C.) | 45–50 |
| Air gap (in.) | 1.25 |
| Gelation bath composition | |
| Water | 44% |
| NMP | 56% |
| PEG400 | 0 |
| IPA | 0 |
| Fiber characteristics | |
| Fiber outside diameter (mil) | 71.9 |
| Fiber inside diameter (mil) | 43.2 |
| Membrane thickness (mil) | 8.3 |
| Tensile (psi) | 657 |
| Elongation | 167% |
| Pure water flux (gfd) at 20 psi | 401 |
| Red wine flux (gfd) at 20 psi | 187 |
| 525 nm Color Passage | 95.7% |

The major characteristics of the hollow fiber membrane obtained in Example 5 are displayed in Table 5. The outside diameter of the hollow fiber was 71.9 mil, the inside diameter was 43.2 mil, and the membrane thickness was 8.3 mil. This fiber had a tensile strength of 657 psi and an elongation of 161%. The pure water flux was 401 gfd at 20 psi. The red wine flux was 187 gfd at 20 psi. The passing of red pigment of Carlo Rossi Burgundy red wine with a maximum absorption at 525 nm wavelength was 95.7%.

The methods used to obtain the membrane in Example 5 were more efficient and easily reproducible than prior methods used to obtain a PVDF hollow fiber membrane because no surfactant was used. The hollow fiber membrane of Example 5 exhibited properties consistent with those of a microfiltration membrane with narrow pore size distribution.

From the foregoing, it will be seen that this invention is one well adapted to attain all the ends and objects herein above set forth together with other advantages which are obvious and inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth is to be interpreted as illustrative and not in a limiting sense.

We claim:

1. A method of making a hollow fiber microfiltration membrane, comprising:
    mixing about 12–30% by weight polysulfone, polyethersulfone, polyvinylidene fluoride or mixtures thereof; polyvinylpyrrolidone; and an aprotic solvent to form a mixture;
    heating said mixture to form a solution;
    adding about 8–25% by weight maleic anhydride to said solution;
    mixing said solution to form a viscous dope; and
    extruding said dope through an annular orifice to form a hollow fiber microfiltration membrane.

2. The method of claim 1, further comprising:
    monitoring the diameter of said hollow fiber membrane.

3. The method of claim 2, wherein the diameter of said fiber is monitored using a laser scan micrometer.

4. The method of claim 1, further comprising:
    providing a gelation bath; and
    feeding said hollow fiber membrane through said gelation bath, wherein said membrane is partially solidified.

5. The method of claim 4, further comprising:
providing a first leaching bath; and
feeding said membrane through said first leaching bath, after feeding through said gelation bath, wherein said fiber is substantially solidified in said leaching bath.

6. The method of claim 5, further comprising:
providing second leaching bath;
providing a take-up wheel partially immersed in said second leaching bath;
feeding said membrane into said second leaching bath; and
collecting said membrane with said take-up wheel.

7. The method of claim 5, wherein said first leaching bath is at a temperature of about 20 to 99° C.

8. The method of claim 4, wherein said gelation bath is comprised of water and N-methyl pyrrolidone.

9. The method of claim 4, wherein said gelation bath is at a temperature of about 20 to 99° C.

10. The method of claim 1, wherein said hollow fiber is formed at about 5 to about 300 feet per minute.

11. The method of claim 1, wherein said polyvinylpyrrolidone is about 8–25% by weight of said mixture extruded to form said membrane.

12. The method of claim 1, wherein said extruding step is performed using a bore fluid comprised of N-methyl pyrrolidone, polyethylene glycol, and isopropylnol.

* * * * *